United States Patent
Jackson

(10) Patent No.: US 11,025,800 B2
(45) Date of Patent: Jun. 1, 2021

(54) SYSTEMS AND METHODS FOR IMAGING FINE ART PAINTINGS

(71) Applicant: Arius Technology Inc., Vancouver (CA)

(72) Inventor: Michael Kevin Jackson, Richmond (CA)

(73) Assignee: Arius Technology Inc., Vancouver (CA)

( * ) Notice: Subject to any disclaimer, the term of this patent is extended or adjusted under 35 U.S.C. 154(b) by 74 days.

(21) Appl. No.: 16/383,495

(22) Filed: Apr. 12, 2019

(65) Prior Publication Data

US 2019/0320094 A1 Oct. 17, 2019

Related U.S. Application Data

(60) Provisional application No. 62/657,501, filed on Apr. 13, 2018.

(51) Int. Cl.
*H04N 1/46* (2006.01)
*H04N 1/60* (2006.01)
(Continued)

(52) U.S. Cl.
CPC .............. *H04N 1/6094* (2013.01); *G01J 3/06* (2013.01); *G01J 3/10* (2013.01); *G01J 3/501* (2013.01);
(Continued)

(58) Field of Classification Search
CPC .... H04N 1/6094; H04N 1/603; H04N 1/6008; G06T 7/90; G06T 3/0068; G06T 11/001;
(Continued)

(56) References Cited

U.S. PATENT DOCUMENTS 4,685,071 A * 8/1987 Lee .................. G06K 9/036
355/38
5,708,498 A 1/1998 Rioux et al.
(Continued)

FOREIGN PATENT DOCUMENTS

WO 2012037085 A1 3/2012

OTHER PUBLICATIONS

Artusi, A. et al., "A Survey of Specularity Removal Methods", Computer Graphics Forum, vol. 30, Issue 8, Dec. 2011, pp. 2208-2230.
(Continued)

*Primary Examiner* — Gabriel I Garcia
(74) *Attorney, Agent, or Firm* — Oyen Wiggs Green & Mutala LLP

(57) ABSTRACT

Color values as a function of position within a painting may be determined by acquiring a plurality of sets of images of the painting. Each set of images may correspond to a different region within the painting. Each image in a set of images may be acquired using a different lighting condition. An optical system comprising a telecentric lens may be used to acquire each image. Within a set of images, corresponding lightness values of pixels may be compared. Lightness values varying from other corresponding lightness values more than a threshold amount may be eliminated. The non-eliminated lightness values for a pixel may be used to generate a processed value for the pixel. The processed values for each pixel representing an imaged region may be combined into a single image. Eliminating lightness values may remove specular highlights and/or shadows. Each of the single images corresponding to each set of images may be registered together to generate a color map image of the painting. The generated color map image may be used to correct color data collected by laser scanning the painting. A
(Continued)

3D printer may, for example, use the corrected laser color data in combination with an elevation map of the painting to produce a faithful reproduction of the painting.

20 Claims, 16 Drawing Sheets

(51) Int. Cl.
| | |
|---|---|
| *G06T 11/00* | (2006.01) |
| *G06T 7/90* | (2017.01) |
| *G06T 3/00* | (2006.01) |
| *G01J 3/50* | (2006.01) |
| *G01J 3/10* | (2006.01) |
| *G01N 21/25* | (2006.01) |
| *G01N 21/27* | (2006.01) |
| *G01J 3/06* | (2006.01) |

(52) U.S. Cl.
CPC .......... *G01N 21/251* (2013.01); *G01N 21/27* (2013.01); *G06T 3/0068* (2013.01); *G06T 7/90* (2017.01); *G06T 11/001* (2013.01); *H04N 1/603* (2013.01); *G01J 2003/104* (2013.01); *G01N 2201/06113* (2013.01); *G01N 2201/12* (2013.01); *H04N 1/6008* (2013.01)

(58) Field of Classification Search
CPC ....... G06T 2003/104; G01J 3/10; G01J 3/501; G01N 21/251; G01N 21/27; G01N 2201/06113; G01N 2201/12
USPC ......................................................... 358/509
See application file for complete search history.

(56) References Cited

U.S. PATENT DOCUMENTS

| | | | |
|---|---|---|---|
| 8,755,627 B2 | 6/2014 | Sellers et al. | |
| 9,245,375 B2 | 1/2016 | Genc et al. | |
| 2006/0139479 A1* | 6/2006 | Dicarlo | H04N 1/6033 348/370 |
| 2017/0003917 A1* | 1/2017 | Nakamori | G06F 3/1225 |

OTHER PUBLICATIONS

Feris, R. et al., Specular Reflection Reduction with Multi-Flash Imaging, Proceedings. 17th Brazilian Symposium on Computer Graphics and Image Processing, 2004, pp. 316-321.

Feris, R. et al., Specular Highlights Detection and Reduction with Multi-Flash Photography. J. Braz. Comp. Soc. [online]. 2006, vol. 12, n. 1, pp. 35-42.

Geng, J., "Structured-light 3D surface imaging: a tutorial", Advances in Optics and Photonics vol. 3, pp. 128-160 (2011).

Macdonald, L. W., "Choosing Optimal Wavelengths for Colour Laser Scanners", Proc. 19th IS&T/SPIE Color Imaging Conf, San Jose, Nov. 2011, pp. 357-362.

Opto Engineering, "Telecentric lenses tutorial", https://www.opto-engineering.com/resources/telecentric-lenses-tutorial, retrieved Apr. 10, 2018.

Malzbender, T. et al., Polynomial Texture Maps, SIGGRAPH '01 Proceedings of the 28th annual conference on Computer graphics and interactive techniques, pp. 519-528, ACM New York, NY, USA, 2001.

Muller, V., Elimination of Specular Surface-Reflectance Using Polarized and Unpolarized Light. In: Buxton B., Cipolla R. (eds) Computer Vision—ECCV '96. ECCV 1996. Lecture Notes in Computer Science, vol. 1065. Springer, Berlin, Heidelberg.

Rioux, M. et al., "Design of a large depth of view three-dimensional camera for robot vision", Optical Engineering, vol. 26, No. 12, pp. 1245-1250 (1987).

Smith, W. J., Chapter 22, Modern Lens Design, Second Edition, McGraw Hill, New York, 2005.

Wikipedia, "Telecentric Lens", https://en.wikipedia.org/wiki/Telecentric_lens, retrieved Apr. 10, 2018.

Elkhuizen, W.S. et al., "Topographical scanning and reproduction of near-planar surfaces of paintings", Proc. SPIE 9018, Measuring, Modeling, and Reproducing Material Appearance, 901809 (Feb. 24, 2014); doi: 10.1117/12.2042492; https://doi.org/10.1117/12.2042492.

Rushmeier, H. et al., "Applying Shape from Lighting Variation to Bump Map Capture", Dorsey J., Slusallek P. (eds) Rendering Techniques '97. Eurographics. Springer, Vienna (1997).

Jackson, M.K. et al., "Color Management in 3D Fine-Art Painting Reproduction", 26th Color and Imaging Conference Final Program and Proceedings, pp. 396-401(6), Society for Imaging Science and Technology, 2018, DOI: https://doi.org/10.2352/ISSN.2169-2629.2018.26.396.

* cited by examiner

SYSTEMS AND METHODS FOR IMAGING FINE ART PAINTINGS

CROSS-REFERENCE TO RELATED APPLICATIONS

This application claims the benefit under 35 U.S.C. § 119 of U.S. application No. 62/657,501 filed 13 Apr. 2018 and entitled APPARATUS AND METHOD FOR COLOR PHOTOGRAPHY OF GLOSSY FINE ART OBJECTS which is hereby incorporated herein by reference for all purposes.

FIELD

This invention relates to high precision imaging suitable for example for imaging fine art paintings. Example embodiments provide systems and methods that can be applied for determining color values of fine art paintings. The invention has example application in creating high quality digital representations of paintings.

BACKGROUND

Masterpiece paintings such as Leonardo da Vinci's "Mona Lisa" or Claude Monet's "Water Lilies" are admired across the world. Collectors, art enthusiasts, curators, tourists, etc. regularly attend public or private showcases of fine art paintings. However, placing a fine art painting on display exposes the painting to risks. The painting may, for example, be damaged by observers (e.g. oily hands), moisture, fire, exposure to light (e.g. damage from UV light, damage from exposure to camera flashes, etc.), etc. Displaying a fine art painting also may expose the painting to an increased risk of theft. Costly systems may be put into place to attempt to protect the painting from damage and/or theft (e.g. anti-theft measures, fire prevention systems, environmental control systems, etc.).

Recent developments in three-dimensional color printing make it feasible to produce high quality reproductions of fine art paintings. Having a faithful reproduction of a painting would allow for a replaceable reproduction to be displayed while an original is stored in a secure location. In addition, high quality reproductions may permit enjoyment of a painting by people who cannot access the original.

Faithfully reproducing a painting requires producing a copy as close as possible to the original painting. This, for example, requires reproducing the visual appearance of the original painting when the reproduction is illuminated using similar lighting conditions, viewed from similar positions, etc. One important aspect for achieving this goal is accurately reproducing color values present in the original painting.

Gloss (e.g. "shininess") can have a significant impact on how color values are perceived. It is common for artists to use glossy paints in their artwork. Glossy paintings tend to have colors that are more saturated than colors of matte paintings. Additionally, or alternatively, many artists finish their work by varnishing or coating their work with a glossy finish.

One way to determine colors that are present in a painting is to capture images of the painting and to process these images to determine color values. Typically, one or more light sources illuminate the painting while an image of the painting is captured. However, given the inherent glossy nature of many paintings, specular highlights often result during this process. Specular highlights occur at positions on a painting where the geometry of the painting's surface combines with an incident angle of light illuminating the painting in such a way that the incident light is reflected towards an observer (e.g. a person's eye or a lens of a camera being used to capture images of the painting).

Obtaining an accurate representation of color values present within a painting is complicated by the presence of specular highlights. Specular highlights typically result in a perceived (or captured) color that is lighter than the correct body color. Depending on how much light is reflected towards the imaging detector and the true color of the painting at that position, specular highlights may result in a color that is significantly lighter than the correct color. For example, a color at a position of the painting that is black may be perceived as being white in some cases when a specular highlight is present at the location. In many cases, a perceived lightness of a color value exceeds what would be perceptible of any matte object.

Many paintings are not completely flat (planar). Various painting techniques can produce surfaces that have significant variations in elevation (e.g. variations on the order of millimeters) as a result of brush strokes, applications of thick layers of paint, applications of multiple layers of paint, etc. These contours can further complicate obtaining correct color values for locations on a painting.

Laser scanners can be used to obtain both colorimetric information and 3D position information about points on a surface. Such scanners use light from plural laser light sources that emit light at different wavelengths. A problem with relying upon such laser scanners for making accurate color measurements is that the scanners are not sensitive at wavelengths other than the laser wavelengths. Since the human eye is sensitive to light having a broad range of wavelengths, two points which a laser scanner indicates to have the same color may not appear to be the same color to a human observer.

There is a general desire for practical systems and methods that can be applied to accurately determine color values that are present at positions within a painting or similar object. There is also a general desire for systems and methods for producing high quality digital and/or physical reproductions of fine art paintings.

SUMMARY

Further aspects and example embodiments are illustrated in the accompanying drawings and/or described in the following description.

One aspect of the invention provides a method for generating color map images of paintings. The color map image may represent color values of a painting as a function of position in the painting. The method may comprise, for each of a plurality of overlapping regions of the painting, acquiring a set of images. The set of images may comprise a plurality of images with different ones of the plurality of images acquired while the region is illuminated by light incident on the region of the painting from different directions. The imaging may be performed by an imaging device including an imaging sensor and an optical system arranged to focus an image of the region of the painting onto the imaging sensor. The optical system may have an object space telecentric configuration wherein chief light rays from points in the region that are parallel to an optical axis of the optical system pass centrally through an aperture of the optical system. A front element of the optical system closest to the painting may be at least as large as the region. The method may also comprise processing each of the plurality of sets of images to provide a processed image of the corresponding region of the painting from which one or both of specular highlights and shadows are removed or reduced. The method may also comprise registering the overlapping processed images together to generate the color map image.

In some embodiments processing each of the plurality of sets of images to remove or reduce one or both of specular highlights and shadows comprises comparing lightness values for corresponding pixels of different images in the set of images being processed to identify pixels in each of the images for which lightness values differ by more than a threshold amount from lightness values for the corresponding pixels in other ones of the images.

In some embodiments the method comprises analyzing surface geometry of the painting in a patch surface surrounding a pixel and based on the geometry determining whether one or more corresponding values of the pixel represent a specular highlight or shadow.

In some embodiments generating the processed image for a region comprises combining corresponding pixel values of the plurality of images while excluding from the combining any pixel values identified as corresponding to a specular highlight or shadow for each pixel in the set of images of the region.

In some embodiments combining the corresponding pixel values comprises determining a single representative value for the corresponding pixel values from the plurality of images.

In some embodiments determining the single representative value comprises one or more of determining an average value, determining a median value and determining a mode value for the corresponding pixel values from the plurality of images.

In some embodiments the method comprises conditioning the images of the set of images. The conditioning may comprise one or more of reducing radial distortion of pixels, compensating for non-perpendicularity of the central optical axis relative to the painting, compensating for non-uniform detection of lighting values and correcting color values.

In some embodiments the method comprises translating the optical system and imaging sensor relative to the painting to image the different overlapping regions of the painting.

In some embodiments the method comprises, for each of the plurality of images, controlling a light source to emit light that is incident on the region at an angle to a plane of the painting and from a different direction.

In some embodiments the light source emits collimated light and an angle of incidence of the light beam onto the region is the same across a field of view of the optical system.

In some embodiments the light source comprises a set of light sources arranged in a line.

In some embodiments the emitted light has uniform intensity across a field of view of the optical system.

In some embodiments, for a plurality of points on a surface of the painting and radially spaced apart from the central optical axis, the points have differing elevations and the optical system eliminates or reduces radial shifting of colors at the imaging sensor.

In some embodiments, for a plurality of points on a surface of the painting, the points having varying elevations, the optical system projects the plurality of points onto an imaging plane of the imaging sensor with a substantially constant magnification as a distance between the front element of the optical system and the painting is adjusted.

In some embodiments the optical system reduces or removes parallax error corresponding to acquiring images of a point on a surface of the painting in different overlapping regions.

In some embodiments the method comprises scanning the painting with a laser scanner to collect color data representative of the painting. The method may also comprise refining the laser color data with the generated color map image. The refining may comprise registering the laser color data with the generated color map image. The refining may also comprise populating a look-up table using color values from the generated color map image and color values from the laser color data, the look-up table corresponding to a color gamut of pigments used to create the painting. The method may also comprise replacing one or more color values from the laser color data that do not match color values from the look-up table with color values from the look-up table.

In some embodiments the method comprises processing the laser color data prior to refining the laser color data, the processing comprising one or more of scaling the laser color data, reducing shading effects present in the laser color data and reducing specular highlights present in the laser color data.

In some embodiments the method comprises masking out values of pixels in the generated color map image prior to populating the look-up table, the masked out values representing one or more of photometric shading, cast shadows and specular highlights.

In some embodiments the laser scanning comprises scanning the painting at first and second complementary angles.

In some embodiments the laser scanner comprises a 450 nm, a 532 nm and a 638 nm single-mode laser.

BRIEF DESCRIPTION OF THE DRAWINGS

Exemplary embodiments are illustrated in referenced figures of the drawings. It is intended that the embodiments and figures disclosed herein are to be considered illustrative rather than restrictive.

DETAILED DESCRIPTION

Figure 1:
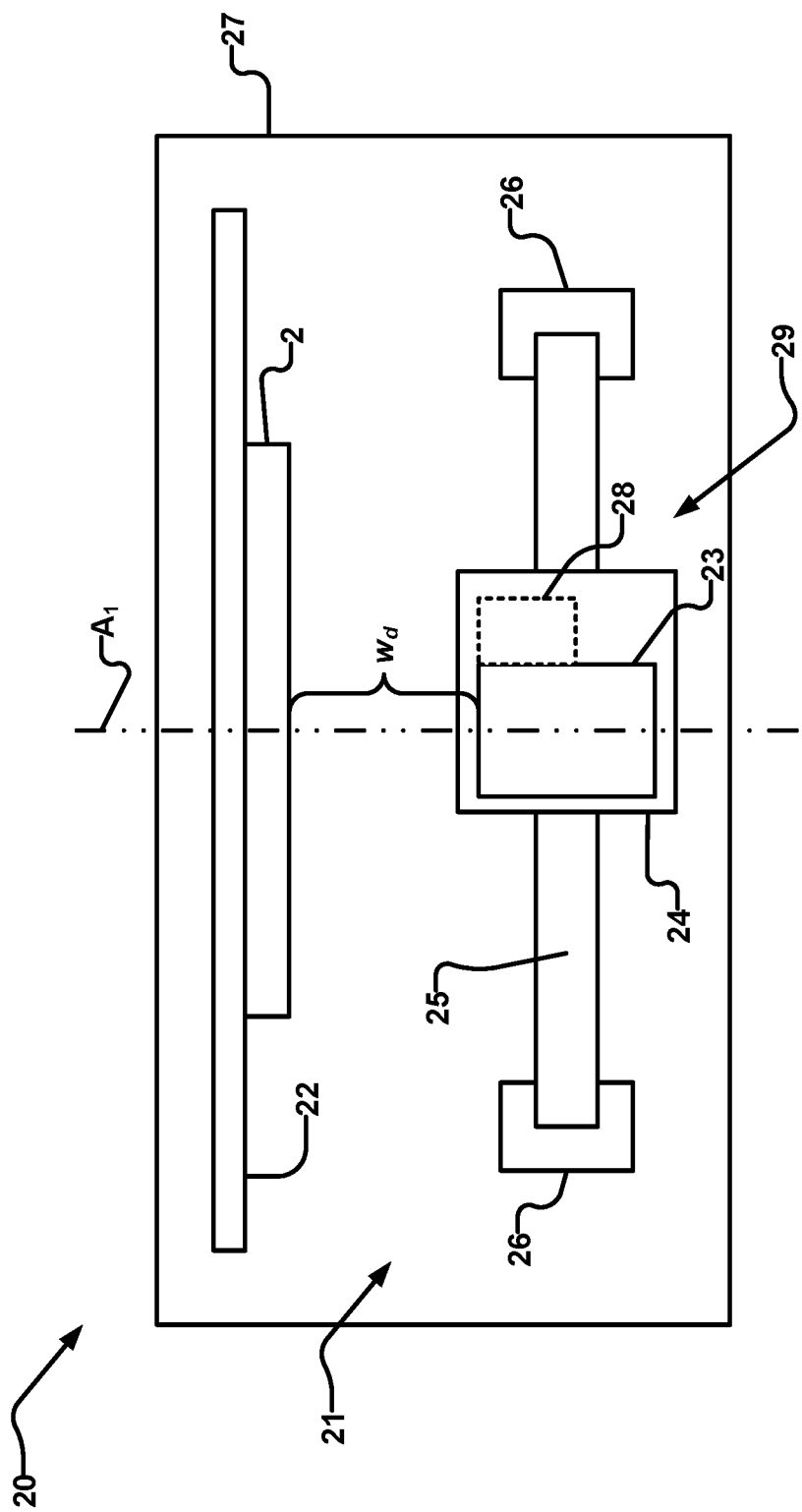
FIG. 1 is a schematic illustration of an example system for scanning a fine art painting.

Throughout the following description, specific details are set forth in order to provide a more thorough understanding of the invention. However, the invention may be practiced without these particulars. In other instances, well known elements have not been shown or described in detail to avoid unnecessarily obscuring the invention. Accordingly, the specification and drawings are to be regarded in an illustrative, rather than a restrictive sense.

Three-dimensional (3D) printers may be used to reproduce fine art paintings. The reproductions can capture both the three-dimensional shape of the paintings and the distributions of colors and tone in the paintings. For example, a 3D printer may be used to produce reproductions of works by artists such as Vincent van Gogh, Claude Monet, Pablo Picasso, etc. 3D printers are commercially available. For example, 3D printers manufactured by Océ Technologies B.V. of Venlo, Netherlands may be used to print reproductions of paintings.

However, creating a high quality reproduction of a painting requires sufficiently detailed and accurate information about the original painting. With good enough information about the original painting it is possible to make a reproduction that is virtually indistinguishable from an original painting. "Virtually indistinguishable" means that an untrained eye is unable to distinguish an original painting from a reproduction from a distance of 1.5 meters. In some embodiments the systems and methods described herein are used to create reproductions that are virtually indistinguishable from the originals.

One aspect of creating a high quality reproduction is to print at a high enough resolution. In some embodiments features present in a painting are reproduced (e.g. "printed") using a resolution that is the same as, or better than, the maximum resolution perceptible by a human eye. In some embodiments a 3D printer is controlled to print with a lateral resolution of 50 to 100 microns or less. For example, the pitch distance between centers of adjacent pixels may be about 0.12 mm or less. To achieve this one should have data describing the painting that has a resolution equal to or higher than the printing resolution.

Reproducing features present in a painting may comprise printing a plurality of layers of UV-curable polymer on top of one another. This may, for example, be used to reproduce brush strokes that are present in a painting. Additionally, or in the alternative, features present in a painting may be reproduced using thermoforming. Thermoforming may comprise printing a colored layer onto a thin thermoplastic sheet. The thermoplastic sheet may then be thermoformed to a physical mold that is dimensioned to produce a desired surface elevation profile.

To reproduce a painting one must have data that accurately describes the painting at a sufficiently high resolution. Such data may be communicated to a 3D printer or other reproduction device. Such data may, for example, include:
- an elevation map that describes the height at any position within the painting as a function of the position; and
- a color map that specifies color values for each location within the painting.

In preferred embodiments, the elevation map and the color map image (each a "data image") represent the same physical space and have the same pixel size and shape, orientation and pixel origin. For example, such a map may specify for each pixel in an x-y plane an elevation corresponding to the pixel and a set of values which represent the color of the pixel in a suitable color space. However this is not mandatory. In some embodiments, a mathematical transformation (or multiple mathematical transformations) may be applied to scale attributes (e.g. physical space, pixel size and/or shape, orientation, pixel origin, etc.) of one data image to match attributes of another data image.

In some embodiments the elevation map comprises a two-dimensional (2D) image comprising pixels each associated with a greyscale (scalar) value encoding height. Each greyscale height value may represent a height (or elevation) of the painting relative to a reference plane or other surface at a location represented by the pixel. In some embodiments, the elevation image may be associated with a scaling factor or scaling function that allows greyscale intensity values of the pixels to be converted into elevation values measured using units of length.

In some embodiments, each pixel is square. This is convenient but not mandatory.

The color map image may encode surface color values of the painting by way of values in a suitable color space. In some embodiments, a color space that is used to encode color values in the color map image may directly correlate to a color space of the 3D printer to be used in printing a reproduction (e.g. the color space may specify color in terms of the same primary colors provided by the printer). The color space should encompass a gamut large enough to record the colors used in a painting. In some embodiments the Adobe™ 1998 color space is used. Other example color spaces that may be used include:
sRGB;
ProPhoto™ RGB;
scRGB;
CIE RGB
LUV
YUV
CIELAB.

One aspect of the invention provides improved systems useful for generating color map images of fine art paintings. Such systems may reduce or eliminate the effect of specular highlights and may generate color map images of sufficient quality to produce high quality reproductions (or, in some cases virtually indistinguishable reproductions) of the fine art painting. In some embodiments color data from a color map image generated by capturing images of painting 2 (e.g. photographing painting 2) is processed to correct and/or improve color data collected by laser scanning painting 2.

FIG. 1 schematically shows an example system 20 which may be applied for generating one or more color map images of a painting 2.

System 20 comprises an easel 22 and an imaging system 23 that is movable relative to easel 22 by a scanning system 29. Scanning system 29 is controllable to position imaging system 23 in selected positions relative to a painting supported on easel 22. Scanning system 29 may comprise any suitably precise positioner. For example, scanning system 29 may comprise an X-Y positioner that can controllably move imaging system 23 along each of two orthogonal axes.

Scanning system 29 preferably moves imaging system 23 in a plane that is parallel to a plane on which easel 22 holds a painting 2 to be imaged. In the illustrated embodiment, imaging system 23 is carried by a mount 24 which is movable in a first (e.g. horizontal) direction (e.g. left to right and vice versa as shown in FIG. 1) by actuator 25 and is movable in a second (e.g. vertical) direction (e.g. into and out of the page as shown in FIG. 1) by actuator 26. The axes of motion provided by actuators 25 and 26 may be orthogonal to one another. Scanning system 29 optionally includes an actuator that can move mount 24 to adjust a distance of imaging system 23 relative to painting 2. Such an actuator may be operated to compensate for curvature in painting 2 and/or tilt of painting 2 relative to the plane defined by orthogonal axes of scanning system 29. Scanning system 29 may optionally achieve relative motion of imaging system 23 and easel 22 on one or more axes by moving easel 22 instead of or in addition to moving imaging system 23.

Scanning system 29 may have any of a wide variety of configurations. Suitable high precision positioning systems are commercially available from a wide range of suppliers.

In preferred embodiments actuators 25 and/or 26 smoothly translate imaging system 23. Smoothly translating imaging system 23 may preserve alignment of imaging system 23 relative to painting 2.

Two or more of mount 24, actuator 25 and actuator 26 may be combined into a single actuator. In some embodiments, scanning system 29 comprises a single actuator having at least three degrees of freedom to translate imaging system 23 relative to painting 2.

In some embodiments scanning system 29 (e.g. one or more of mount 24, actuator 25 and actuator 26) may vary both a position of imaging system 23 and an orientation (e.g. roll, pitch, yaw) of imaging system 23 relative to painting 2. In some embodiments, scanning system 29 is associated with a positioning error map that characterizes deviations between actual and ideal position and/or orientation of imaging system 23 when scanning system 29 is set to a specific position. The positioning error map may be used to correct the position and/or orientation of imaging system 23 and/or to correct a correlation between pixels in images acquired by imaging system 23 and points on a painting 2.

In some embodiments scanning system 29 (alone or in combination with imaging system 23) focuses imaging system 23 on a surface of painting 2. In some embodiments imaging system 23 is operative to automatically focus on a surface of painting 2. Additionally, or alternatively, a position and/or orientation of imaging system 23 relative to painting 2 and/or a lens of imaging system 23 may be manually adjusted to focus imaging system 23 on a surface of painting 2. Since the surface of painting 2 is generally not flat, imaging system 23 may be focused on a plane that is intermediate between high and low points on the surface of the painting. Imaging system 23 may have a depth of field sufficient to capture sharp images of the surface of the painting.

System 20 comprises light sources 32 (described below) that may be operated to illuminate painting 2. Light sources 32 are configured to facilitate illuminating painting 2 under different illumination conditions. The illumination conditions may differ, for example, by the direction from which light is incident on painting 2.

System 20 may include an enclosure 27 which encloses easel 22, imaging system 23 and scanning system 29. Enclosure 27 may block ambient light from illuminating painting 2 and/or protect painting 2 from damage. Enclosure 27 may shield painting 2 and/or imaging system 23 from environmental influences such as wind, air drafts, dust, etc. Enclosure 27 may further protect painting 2 from influences that could alter positioning of painting 2 relative to imaging system 23. Painting 2 may be positioned within an internal cavity 21 of enclosure 27. Enclosure 27 may be removable, include an opening, include a door, and/or the like to facilitate insertion and/or removal of painting 2 into internal cavity 21.

In some embodiments, system 20 comprises feet that reduce, or eliminate movement of system 20 as a result of environmental disturbances (e.g. floor vibrations, a person bumping into system 20, wind drafts, etc.). One or more surfaces of the feet may be coated with a vibration damping material. Additionally, or alternatively one or more shock absorbing couplings may be incorporated into the structure of system 20.

Easel 22 may hold painting 2 within cavity 21 of system 20. In some embodiments easel 22 comprises a lower ledge on which a surface of painting 2 may be rested. In some embodiments one or more surfaces of easel 22 frictionally engage opposing surfaces of painting 2. In some embodiments one or more surfaces of easel 22 are coated with a vibration dampening material. Easel 22 may be configured to reduce motion of painting 2 that may distort captured images of painting 2 (e.g. vibrations of painting 2, displacement of painting 2 relative to easel 22, etc.). In some embodiments easel 22 is rigidly mounted within cavity 21. In some embodiments easel 22 is integral with enclosure 27.

In some embodiments system 20 comprises a scanner 28 which may be operated to map surface elevations and/or color values of painting 2 as a function of position within painting 2. In some embodiments scanner 28 is a laser scanner. For example, scanner 28 may comprise an RGB scanner. The RGB scanner may emit light at a plurality of wavelengths. In some embodiments scanner 28 comprises a plurality of single-mode lasers. For example, scanner 28 may comprise single-mode lasers that emit light having wavelengths of 450, 532 and 638 nm. Scanner 28 may be mounted to be moved by scanning system 29. For example, scanner 28 may be coupled to mount 24. In some such embodiments data acquired by scanner 28 (elevation values and/or color values) and data acquired by imaging system 23 (color values) may be acquired in the same image space and may be correlated to one another relatively easily (i.e. by identifying the elevation value and color value(s) corresponding to a particular position within painting 2).

A scanning mirror may focus and/or project light (e.g. laser beams) from scanner 28 onto a surface of painting 2. A light detector of scanner 28 may collect light that is scattered from a point on painting 2. Scanning system 29 may be operated to move scanner 28 through a range of positions so that scanner 28 acquires data for the full area of painting 2.

In some embodiments scanner 28 and imaging system 23 are coupled to scanning system 29 together (e.g. adjacent one another on mount 24). In some embodiments scanner 28 and imaging system 23 are coupled to scanning system 29 interchangeably. For example, scanner 28 may be coupled to mount 24 and operated to scan a painting 2 and then imaging system 23 may be coupled to mount 24 and used to scan painting 2 or vice versa. In such embodiments one of imaging system 23 and scanner 28 scans painting 2 at a time.

Scanner 28 may comprise a translation stage. The translation stage may be operated to adjust the angle of incidence of scanning light relative to a normal vector of painting 2 (i.e. a vector perpendicular to a plane of painting 2). In some embodiments scanner 28 scans painting 2 with light incident at two angles (e.g. +/−20 degrees). In some such embodiments scanner 28 scans to determine elevations or elevations and colors along each scan line of painting 2 twice. Each scan of the scan line may use light incident on painting 2 at a different angle of incidence. For example, the scan lines may be horizontal lines across painting 2. A different horizontal line may be scanned by translating scanner 28 vertically. Scanner 28 may, for example, scan the horizontal line at a desired angle of incidence in one direction and may proceed to scan the horizontal line a second time at a complementary angle of incidence by rotating the scanner to the complementary angle and traversing the same horizontal line in reverse.

Imaging system 23 is operative to capture images of painting 2. Typically, each image captured by imaging system 23 corresponds to a region of painting 2 that is smaller than the entire area of painting 2. Scanning system 29 may be operated to position imaging system 23 for acquiring images of each region. In such typical cases obtaining a color map of painting 2 requires obtaining images of regions which collectively cover the whole area of painting 2. Each of the regions preferably overlaps with some neighboring regions.

Scanning system 29 and/or easel 22 may be controlled to move imaging system 23 (and/or scanner 28) relative to painting 2 to the positions required to image all of the regions. Images of different regions of painting 2 may be registered together to generate a color map image of painting 2 as described herein.

System 20 may be operated to capture images of each region under each of a plurality of different lighting conditions. In some embodiments system 20 is controlled to capture sets of images of painting 2. Each set of images may correspond to a different region of painting 2. Each image in a set of images may be captured using a different lighting condition (e.g. using a different light source 32 or set of light sources 32). The lighting conditions may differ from one another in the direction from which the light is incident on the region of the painting 2 being imaged. The sets of images may be processed to generate a color map image 102 of painting 2.

The imaged regions of painting 2 may be chosen such that adjacent regions overlap by at least an amount necessary to accurately stitch images of the adjacent regions together. In some embodiments two adjacent regions overlap by a distance equal to 50% of a width of each region. In some embodiments each region of painting 2 that is imaged overlaps with its adjacent regions by an equal amount. In some embodiments each region overlaps with at least one neighboring region by a distance that is at least 100 times greater than a pitch of pixels in the image. For example in the case where the image has a resolution of 200 pixels per 25 mm the neighboring regions may overlap by at least 12.5 mm.

In some embodiments a size of painting 2 may be ascertained by system 20. For example, system 20 may move imaging device 23 across painting 2 while processing images captured by imaging device 23 and/or information (e.g. elevation and/or color information) from scanner 28 to detect corners or edges of painting 2. In some embodiments a size of painting 2 is communicated to system 20 by a user. Data may be communicated to system 20 using any presently known or future discovered method of communicating data to a system. The size information may be used to establish the locations of overlapping regions to be imaged and corresponding locations at which imaging device 23 should be positioned to image each of those regions. If optional scanner 28 is included, the size information may be used to determine locations at which scanner 28 may be positioned to scan painting 2.

In some cases painting 2 is decoratively framed. Removing a painting from a decorative frame may damage the painting. In some embodiments system 20 detects the presence of a decorative frame. In such embodiments system 20 may ignore the decorative frame when computing the size of painting 2 and/or capturing images of painting 2.

Preferably an optical axis of imaging system 23 is oriented perpendicular to a plane of painting 2.

A front element of a lens of imaging system 23 may be separated from painting 2 by a working distance $w_d$. "Working distance $w_d$" is the distance between the end of an optical system of imaging system 23 (e.g. optical system 31 of FIG. 2) that is closest to painting 2 and a surface of painting 2.

$w_d$ may be comparatively small. In a preferred embodiment $w_d$ is about 150 millimeters. In some embodiments $w_d$ is less than 1 meter. In some embodiments $w_d$ is in the range of 100 millimeters and 300 millimeters. In some embodiments $w_d$ is the same as a working distance of elevation scanning system 28 used to generate the corresponding elevation map.

Scanning system 29 may be configured so that working distance $w_a$ is fixed. In some embodiments scanning system 29 is configured to permit control of working distance $w_a$ (e.g. by controlling a position of imaging device 23 in a direction perpendicular to easel 22). As described elsewhere herein, mount 24 may be operable to adjust working distance $w_a$. Some embodiments provide a manual adjustment that can be operated to adjust working distance $w_a$.

Figure 2:
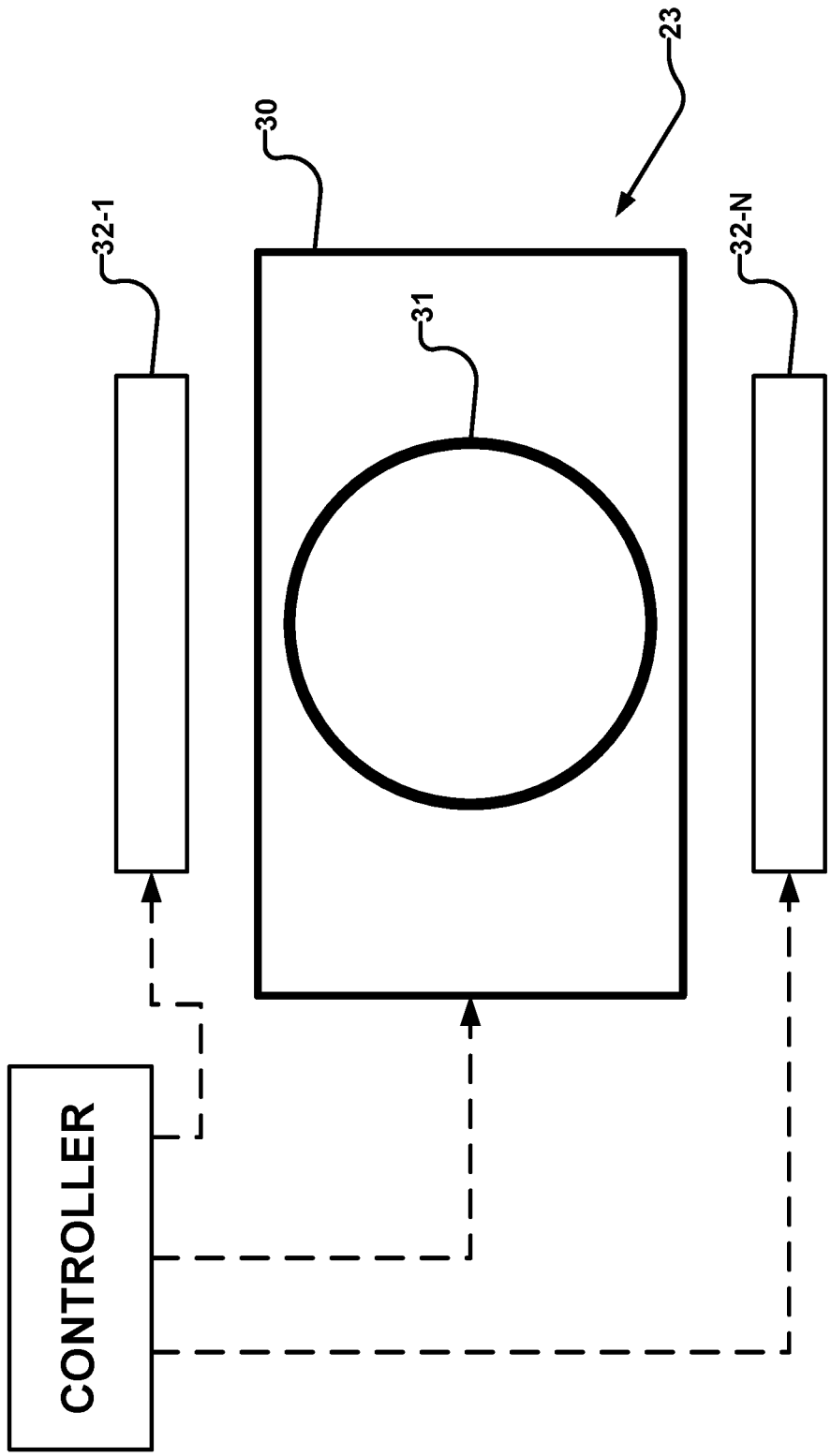
FIG. 2 is a schematic illustration of an example imaging system that may be used by the FIG. 1 system.

FIG. 2 shows an example imaging system 23. Imaging system 23 comprises a camera 30 having an imaging sensor. Camera 30 captures images of painting 2 (or any other objected positioned on easel 22). An optical system 31 collects light and focuses the light onto the imaging sensor of camera 30.

Optical system 31 comprises a compound lens having elements arranged as an object space telecentric lens. Optical system 31 has an entrance pupil at infinity. In some embodiments optical system 31 has both an entrance pupil and an exit pupil at infinity (e.g. optical system 31 comprises a "bi-telecentric lens" or a "double telecentric" lens). Advantageously, embodiments where optical system 31 is a bi-telecentric lens may allow for additional control over directions from which rays are incident on an imaging device sensor (e.g. an imaging sensor of camera 30).

A front element of optical system 31 closest to painting 2 is at least as large as each region being imaged.

The design of optical system 31 as a telecentric lens avoids distortions that could occur with ordinary lenses and therefore facilitates more accurate stitching together of images for different regions into a color map. This also facilitates registering pixels of a color map with pixels acquired by a scanning device (e.g. a laser scanner as described elsewhere herein). Pixels of different sets of images that correspond to the same part of painting 2 (e.g. in areas of overlap between the regions of the different sets of images) should appear the same when imaged and should provide color values that come from the same locations on painting 2. However, where the surface of paining 2 is textured (not flat) the varying elevations of painting 2 (e.g. typically 5-10 mm but may be 20 mm or more) can result in radial shifting of pixels when a conventional lens is used. Radial shifting of corresponding pixels may complicate registration of the sets of images, distort color map image 102 and/or the like. This effect, which is illustrated in FIG. 3A is exacerbated where working distance $w_a$ is small (e.g. less than 1 m) as described elsewhere herein.

Figure 3A:
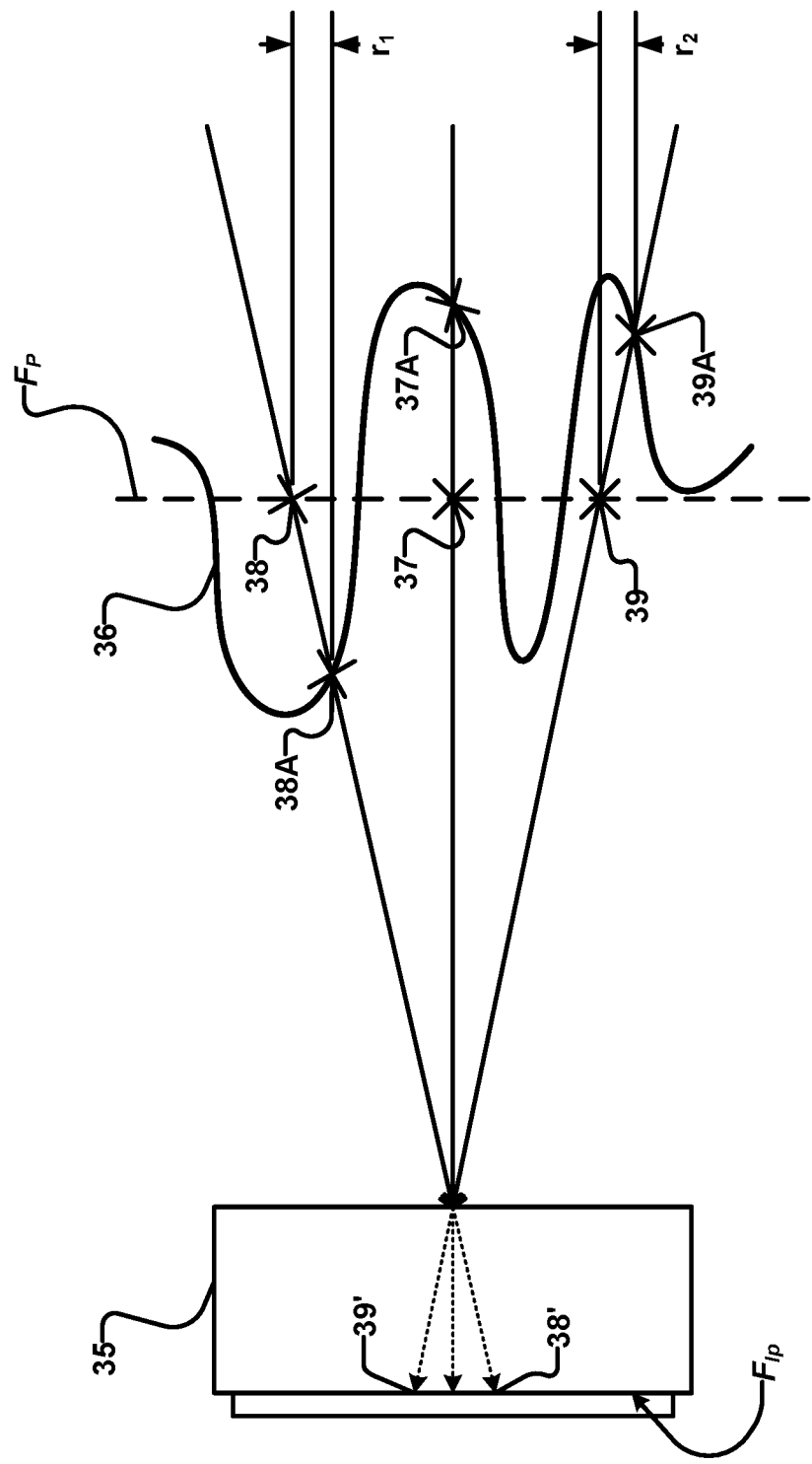
FIG. 3A is a schematic illustration showing an example focal plane of a conventional fixed focal point lens.

FIG. 3A schematically illustrates that surface 36 of painting 2 can have varying elevations within a region being imaged. It is desired that each position on painting 2 corresponds to one corresponding point in image plane $F_{Ip}$. This way the color values detected by an image sensor in image plane $F_{Ip}$ can be associated to a specific corresponding location on painting 2.

FIG. 3A shows the case where painting 2 is imaged using a conventional lens. Point 37A aligns with a longitudinal central optical axis of a conventional lens 35. Point 37, which is a projection of point 37A onto a focal plane $F_p$ of lens 35, therefore aligns directly with point 37A. However, for points on painting 2 located away from the central optical axis of lens 35, differences in elevation at the points can cause the color recorded at a location on image plane $F_{Ip}$ which should correspond to the color at a specific location on painting 2 to instead record the color at a radially shifted location. For example, points 38' and 39' in image plane $F_{Ip}$ correspond to locations 38 and 39 in painting 2 and should record colors at the X-Y positions of locations 38 and 39 respectively. Due to the elevation changes in painting 2, however, point 38' records the color at point 38A and point 39' records the color at point 39A. Point 38A is radially shifted from point 38 by an amount $r_1$. Point 39A is radially shifted from point 39 by an amount $r_2$. Thus, images of some locations of painting 2 are radially shifted in the image plane.

Figure 3B:
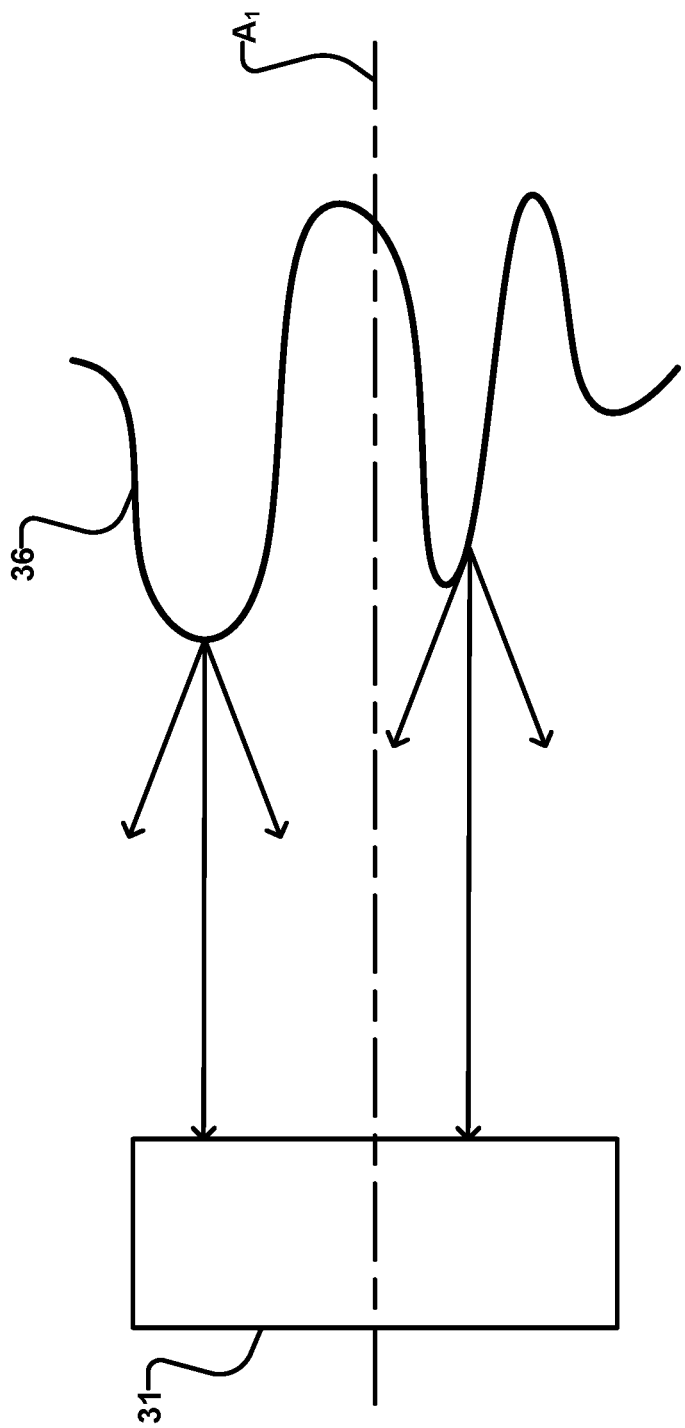
FIG. 3B is a schematic illustration of an optical system according to an example embodiment.

FIG. 3B illustrates how optical system 31 avoids the radial shift described above. Since optical system 31 is configured to have an entrance pupil at infinity, surface 36 of painting 2 appears flat from the point of view of imaging device 23 irrespective of working distance $w_d$. Furthermore, magnification does not vary with distance. This, for example, may be achieved by configuring optical system 31 to collect central rays ("chief rays" that pass through the centre of an aperture of optical system 31) from points on surface 36 parallel to central optical axis $A_1$ (see e.g. FIG. 3B). Advantageously, optical system 31 may reduce or eliminate parallax error and/or changes in magnification of points on surface 36 as a function of working distance $w_a$.

Figure 3C:
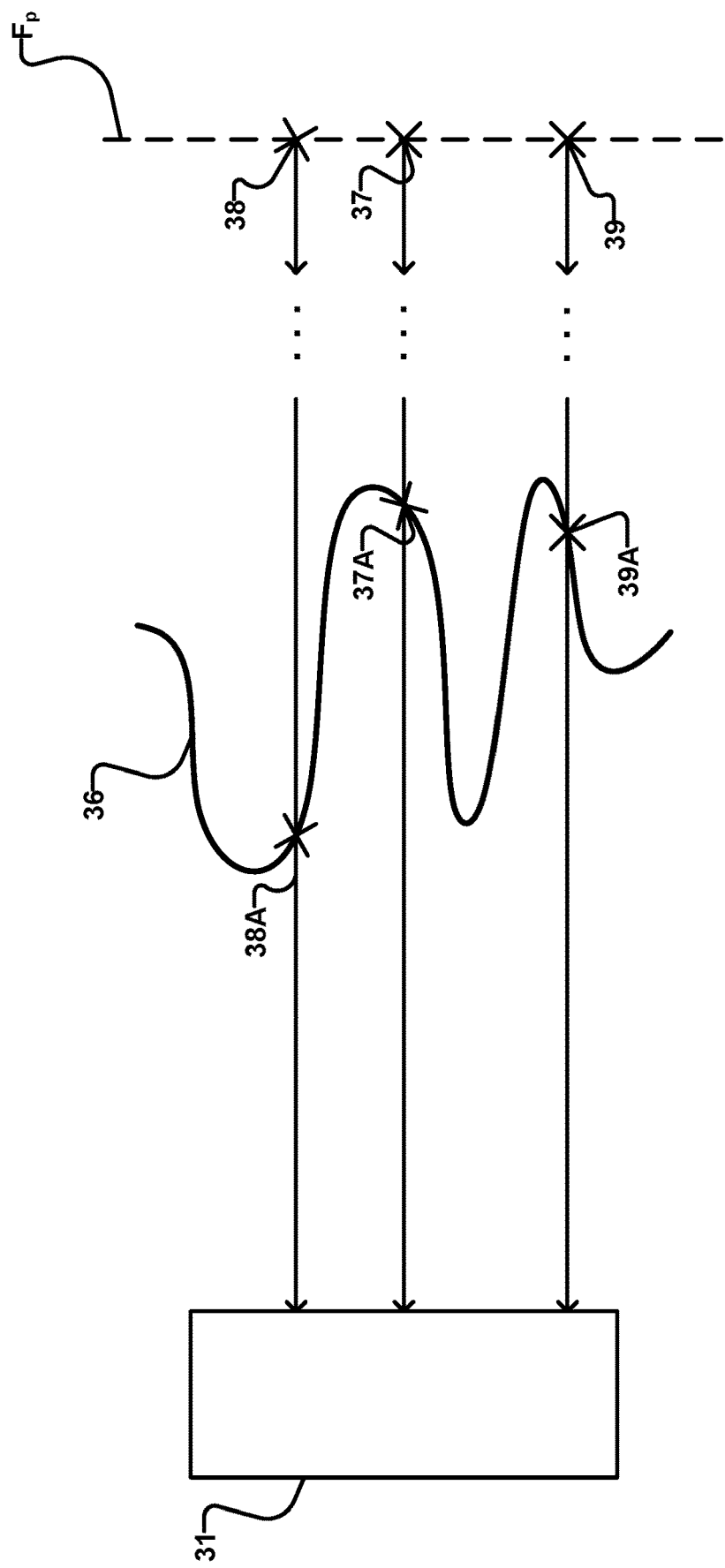
FIG. 3C is a schematic illustration of an optical system according to an example embodiment.

As shown in FIG. 3C, projections 37, 38 and 39 of points 37A, 38A and 39A respectively onto focal plane $F_p$ are not radially shifted by optical system 31 as a result of any changes in elevation of the surface of painting 2.

Figure 4:
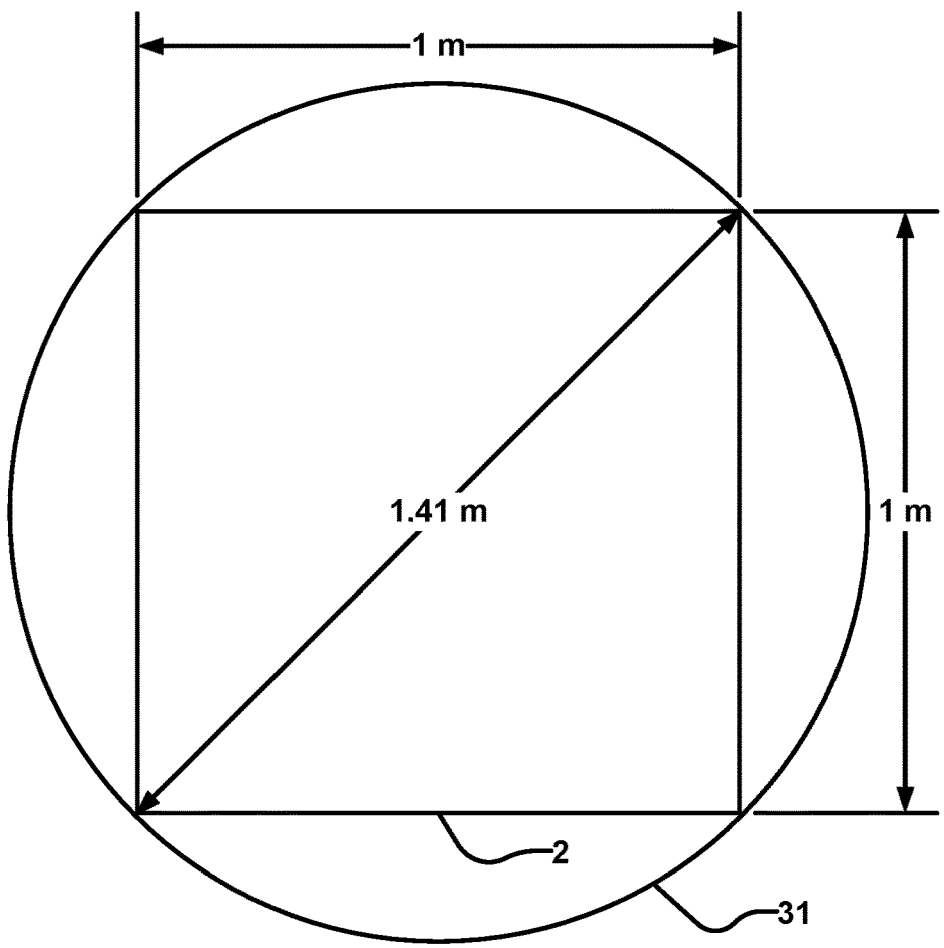
FIG. 4 is a schematic illustration showing an example optical system relative to a painting.

However, using optical system 31 limits a size of a region of painting 2 that may be captured in a single image. A region of painting 2 to be imaged must fit within an area corresponding to a lens diameter of optical system 31. For example, if painting 2 is a 1 meter high by 1 meter wide painting, capturing painting 2 in a single image would require an optical system 31 that has a diameter of at least about 1.41 meters (see e.g. FIG. 4). This is usually impractical. Instead, system 20 captures sets of images of different regions of painting 2 that may be registered together (e.g. using the methods described elsewhere herein) to generate a color map image of painting 2.

In preferred embodiments camera 30 stores captured images in an uncompressed format. For example, the uncompressed format may be a commercially known RAW format. Compressing captured images may distort elements of the captured images such as white balance, color values, etc.

In preferred embodiments imaging system 23 is aligned relative to painting 2 such that central optical axis $A_1$ is perpendicular to a plane of painting 2. This alignment may be achieved, for example, with the aid of a flat mirror positioned on easel 22 or otherwise positioned to be parallel to a plane of painting 2. The mirror may be marked with a target such as cross-hair (e.g. a "+" sign) printed or applied to a surface of the mirror. Alignment of imaging system 23 can be checked by taking an image of the target and mirror and verifying that a feature of imaging system 23 is in a desired location relative to the target. For example alignment may be confirmed when the captured images include an image of a circular lens of imaging system 23 being centered relative to an image of the target.

In some cases additional factors may need to be considered when aligning imaging system 23 with painting 2. For example, when painting 2 is not flat there is some ambiguity in defining the plane of painting 2. Painting 2 may, for example, have brushwork at varying elevations. In some cases, brushwork has elevations in a range of about 5-10 millimeters. In some cases, brushwork has an elevation up to 20 millimeters. In some cases brushwork has an elevation of more than 20 millimeters.

As another example, painting 2 may be non-planar. In some cases, a stretcher supporting a canvas of painting 2 may be warped thereby resulting in a painting 2 that is non-planar. As another example, painting 2 may comprise a work directly painted onto a non-planar substrate such as wood. Alignment of imaging system 23 may take into consideration the non-planar nature of painting 2 (if applicable).

In some embodiments, positions of imaging system 23 and/or painting 2 are dynamically varied to align optical system 31 with painting 2. For example, mount 24 and/or easel 23 may dynamically align optical system 31 with a region being imaged.

In some embodiments a stabilizer such as a gimbal or similar device maintains imaging system 23 in a substantially constant alignment relative to painting 2. Additionally, or alternatively, captured images may be processed and/or calibrated to correct misalignments of imaging system 23 relative to painting 2.

As described elsewhere herein, light incident on painting 2 may result in specular highlights. Different incident angles may result in different pixels being affected by specular highlights. Additionally, or in the alternative, when light is incident on painting 2 projecting parts of painting 2 may cast shadows. Differing elevations of painting 2 may result in shadows being cast across lower elevation portions of painting 2 depending on incident angles of light. Shadows may result in colors appearing darker than their true value. Different incident angles may result in different pixels being affected by shadows.

For each region of painting 2 that is imaged, imaging system 23 may be controlled to capture a set of images using a different lighting condition. Each lighting condition may correspond to a different incident angle and/or direction of light. Since the locations of specular reflections and shadows can depend on the incident angle and/or direction of light, different pixels will be affected by shadows and/or specular reflections in different images of the set of images. Further, for any given pixel there is a likelihood that for at least some of the lighting conditions the pixel is neither affected by specular reflection or a shadow. A greater number of lighting conditions tends to reduce the likelihood that at least some of the lighting conditions will yield images which record the true color of each pixel in the images of the region of painting 2.

System 20 may comprise a plurality of light sources 32-1, . . . , 32-N (collectively or generally light source 32). Light sources 32 may be used to illuminate a region of painting 2 that is being imaged. Light sources 32 may be mounted peripherally around camera 30 and/or optical system 31 (see e.g. FIG. 2). Each light source 32 may emit light that is incident on painting 2 at a different angle.

In some embodiments system 20 comprises two light sources 32 (N=2). In some embodiments system 20 comprises in the range of 2 to 8 light sources 32 (2<N≤8). In some embodiments system 20 comprises more than 8 light sources (N>8). Four light sources has been found to be sufficient. Light sources 32 may be generally linear (e.g. rows of light emitters).

Figure 2A:
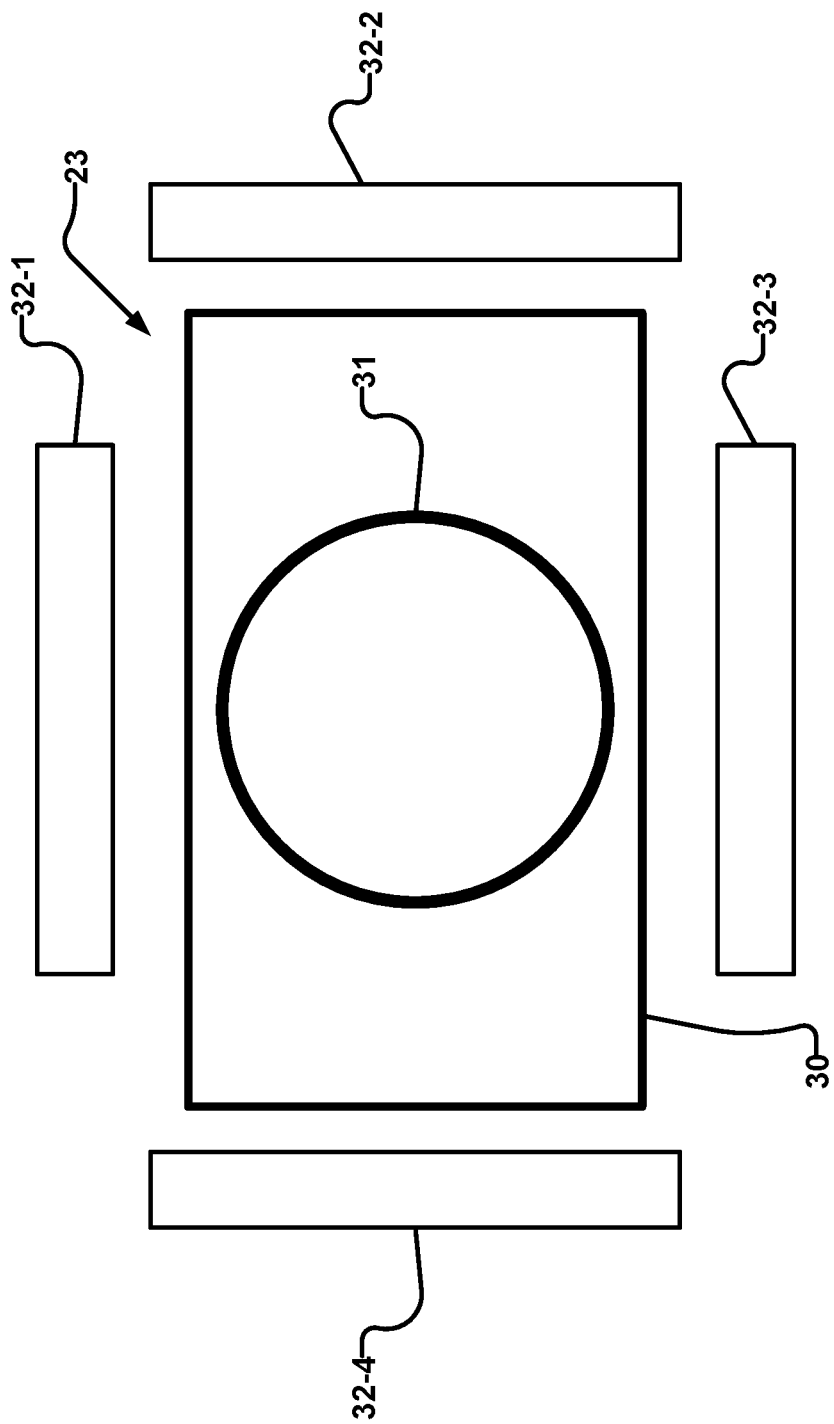
FIGS. 2A and 2B are schematic illustrations of example arrangements of light sources.

Although light sources 32 are illustrated as being oriented symmetrically around optical system 31 in FIG. 2, this is not mandatory. Light sources 32 may be arranged around optical system 31 and/or camera 30 in any orientation. Symmetrically arranging light sources 32 may however reduce the likelihood of each light source 32 resulting in a specular highlight or cast shadow for a specific position within painting 2. In preferred embodiments light sources 32 are arranged symmetrically around optical system 31 and/or camera 30. For example, if imaging system 23 comprises 4 light sources, each of the light sources may be separated by 90 degrees from the other light sources (see e.g. FIG. 2A).

Light sources 32 may be oriented to emit light at any angle. In some embodiments light emitted from each of light sources 32 is incident with the plane of painting 2 at about a 45 degree angle.

Figure 2B:
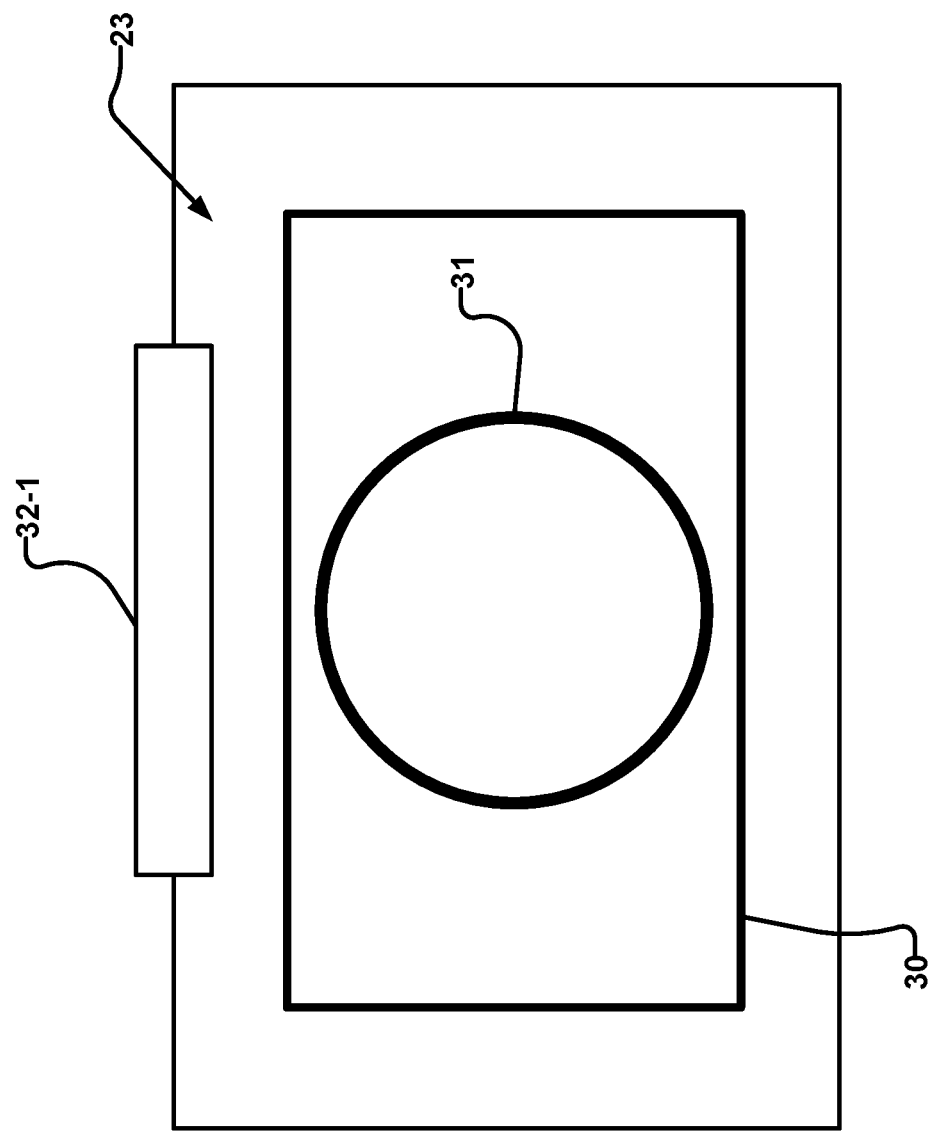

In some embodiments system 20 comprises a single light source that may be moved to a plurality of positions around optical system 31 and/or camera 30. For example, the light source may move to different positions around a track that extends around optical system 31 and/or camera 30 (see e.g. FIG. 2B).

Preferably each light source 32 emits a substantially identical light beam. Each light source may comprise a light bulb, LED source or the like.

A controller may control the overall operation of system 20 including operations such as:
  when camera 30 captures an image;
  which of light sources 32 illuminates painting 2 when each image is being acquired;
  where imaging device 23 is positioned for each image;
  etc.

In some embodiments some images may be taken using light from two or more light sources 32.

Preferably, a light beam corresponding to a lighting condition is incident at an identical angle across a field of view being imaged. In addition, a light beam corresponding to a lighting condition preferably has uniform intensity across the field of view.

Figure 5:
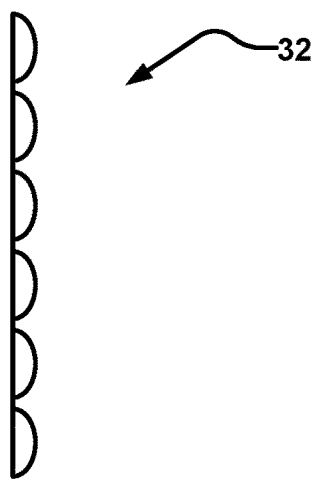
FIG. 5 is a schematic illustration showing an example light source.

In some embodiments, a light source generates a light beam that is extended in one direction relative to the field of view. For example, light source 32 may be extended in the horizontal or vertical direction. In preferred embodiments, light sources 32 are extended at least in one direction. Extending a light source may tend to equalize illumination intensity in a direction parallel to the extension. A light source may, for example, be extended by an amount that is double the greater of the width or the height of the field of view (the region of painting 2 being imaged). In some embodiments an extended light source comprises a plurality of light sources arranged in a line (see e.g. FIG. 5) or a light guide that emits light along a line.

A light source may also be extended in a second direction so that the light is emitted over a wider area (e.g. a rectangular area).

Figure 6A:
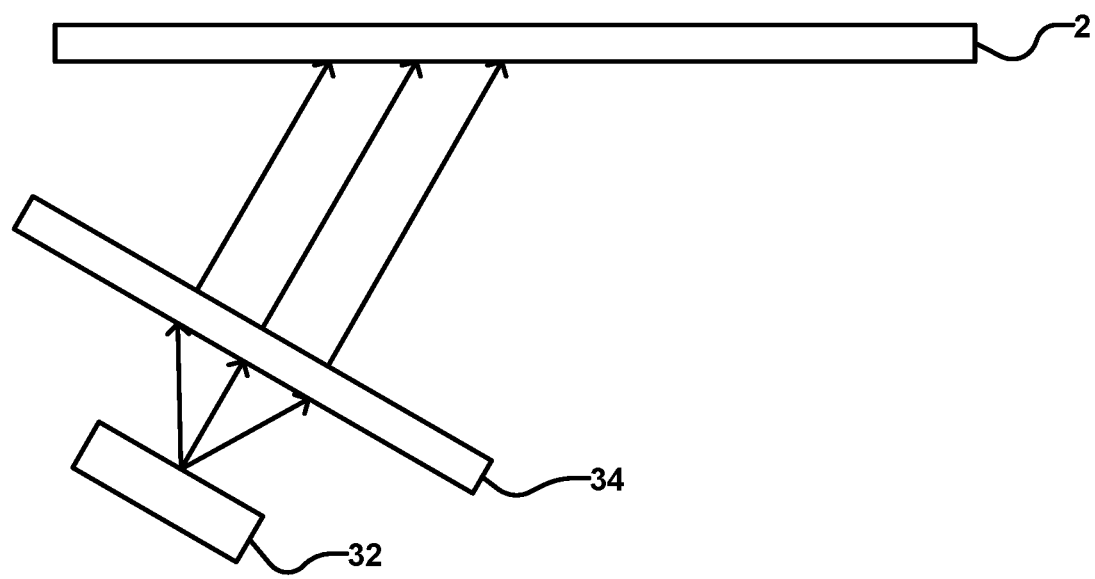
FIGS. 6A and 6B are schematic illustrations showing example systems for collimating light.

Light sources may include lenses or other optical elements to improve illumination of a region being imaged. For example a lens 34 may be provided in a light path between a light source 32 and painting 2 as shown in FIG. 6A. Illumination lens 34 may act to collimate the light incident on painting 2.

Illumination lens 34 may, for example comprise a cylindrical telecentric lens. To illuminate all of a field of view having a maximum extent on the order of 60 mm, for example, the light source may emit a beam of light having a width of at least approximately $60/\sqrt{2}$ mm (approximately 42 mm). Lens 34 may have a compound lens design as described, for example, in W. J. Smith in Modern Lens Design, Second Edition, McGraw Hill, New York, 2005.

Figure 6B:
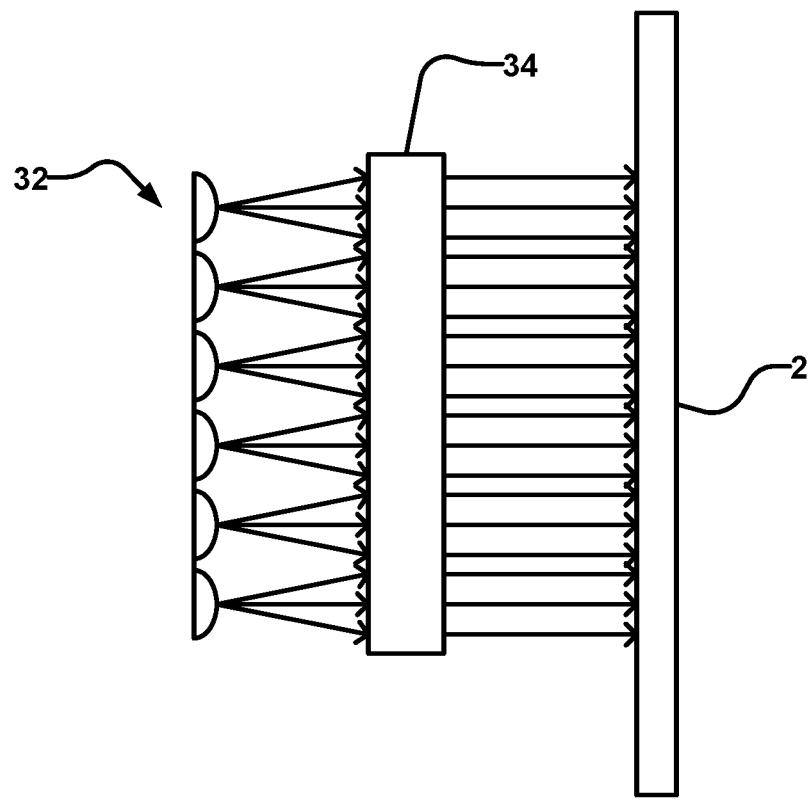

In some embodiments lens 34 may collimate light in both horizontal and vertical directions across the field of view. In such embodiments light source 32 may comprise a point source (e.g. a single LED) or a plurality of point sources (e.g. a line of LEDs) in the direction which has not been collimated (see e.g. FIG. 6B).

In some embodiments light sources 32 are located relatively far from painting 2. Positioning light source 32 far from the field of view may equalize path lengths from different parts of a light source 32 to various portions of the field of view such that the illumination is more uniform over the field of view. The distance between light sources 32 and painting 2 may be limited by the available space in some cases.

Figure 7:
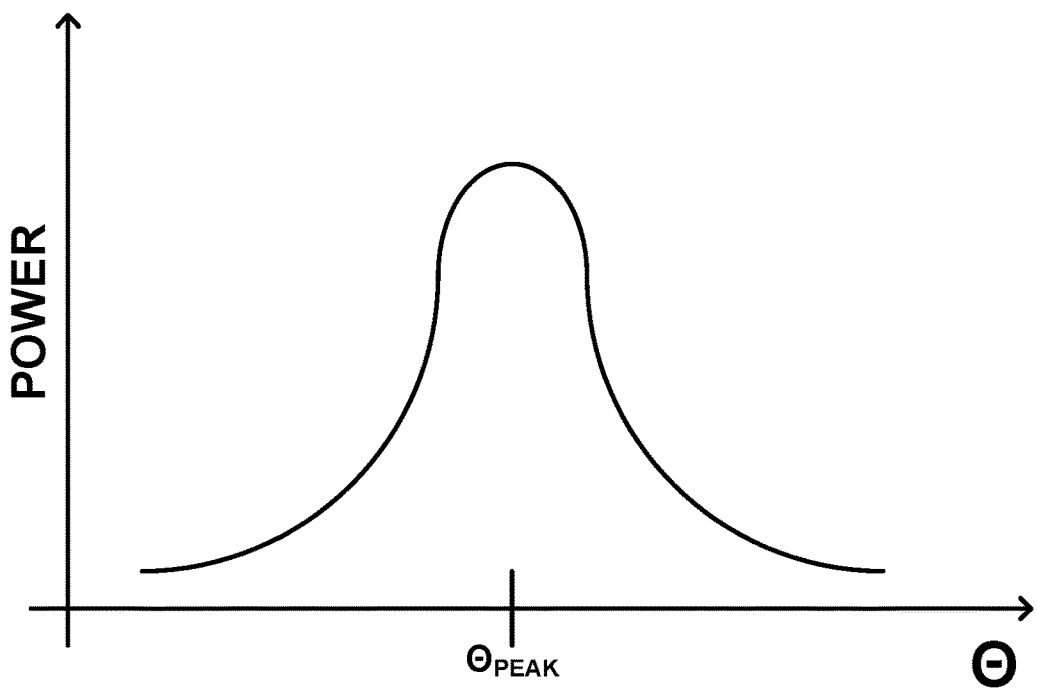
FIG. 7 is a schematic illustration showing an example intensity function of a light source.
Figure 8:
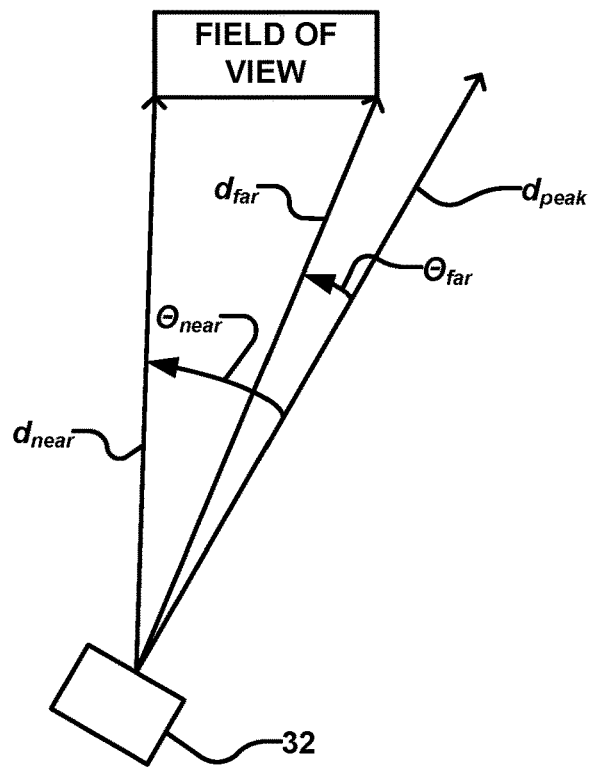
FIG. 8 is a schematic illustration showing an example arrangement for collimating light.

In some embodiments light source 32 comprises a light source in which the intensity of emitted light varies with angle. FIG. 7 is a graph which shows schematically an example output profile of light intensity as a function of angle. Profiles like that shown in FIG. 7 are typical of many light emitting diode (LED) sources, for example. Such a source may be positioned as shown in FIG. 8 at an angle such that the peak emission angle is directed outside the field of view on the side of the field of view away from the source (the far side). When such positioning is used the emission at angle $\theta_{far}$ may be higher than that at $\theta_{near}$, which may compensate for the fact that the illumination intensity in W/m$^2$ is higher on the near side of the field of view compared to the far side because the distance $d_{near}$ is lower than $d_{far}$. Positions of light sources 32 may be varied (e.g. varying incident angles and/or distances from painting 2) may be used to reduce intensity variations across the field of view.

In some embodiments system 20 comprises one or more sensors for monitoring environmental conditions such as humidity, temperature, etc. within cavity 21. If environmental conditions that may potentially damage painting 2 are detected, then system 20 may, for example, cease operation of system 20, activate a warning system such as an alarm, activate a correction system such as a cooling fan, etc.

System 20 may be portable and/or stationary. In some embodiments system 20 is designed to be mounted at a permanent location. In some embodiments system 20 is designed for portability. For example, system 20 may comprise wheels that may be used to transport system 20 from place to place or system 20 may be made so that it can be readily disassembled into readily portable components.

Another aspect of the invention provides a method for generating a color map image of a painting. As described elsewhere herein, the color map image represents color values as a function of position within the painting. To generate the color map image, images of the painting may be acquired, processed to remove specular highlights and/or shadows and registered together. Images of the painting may be acquired, for example, as described above.

Figure 9:
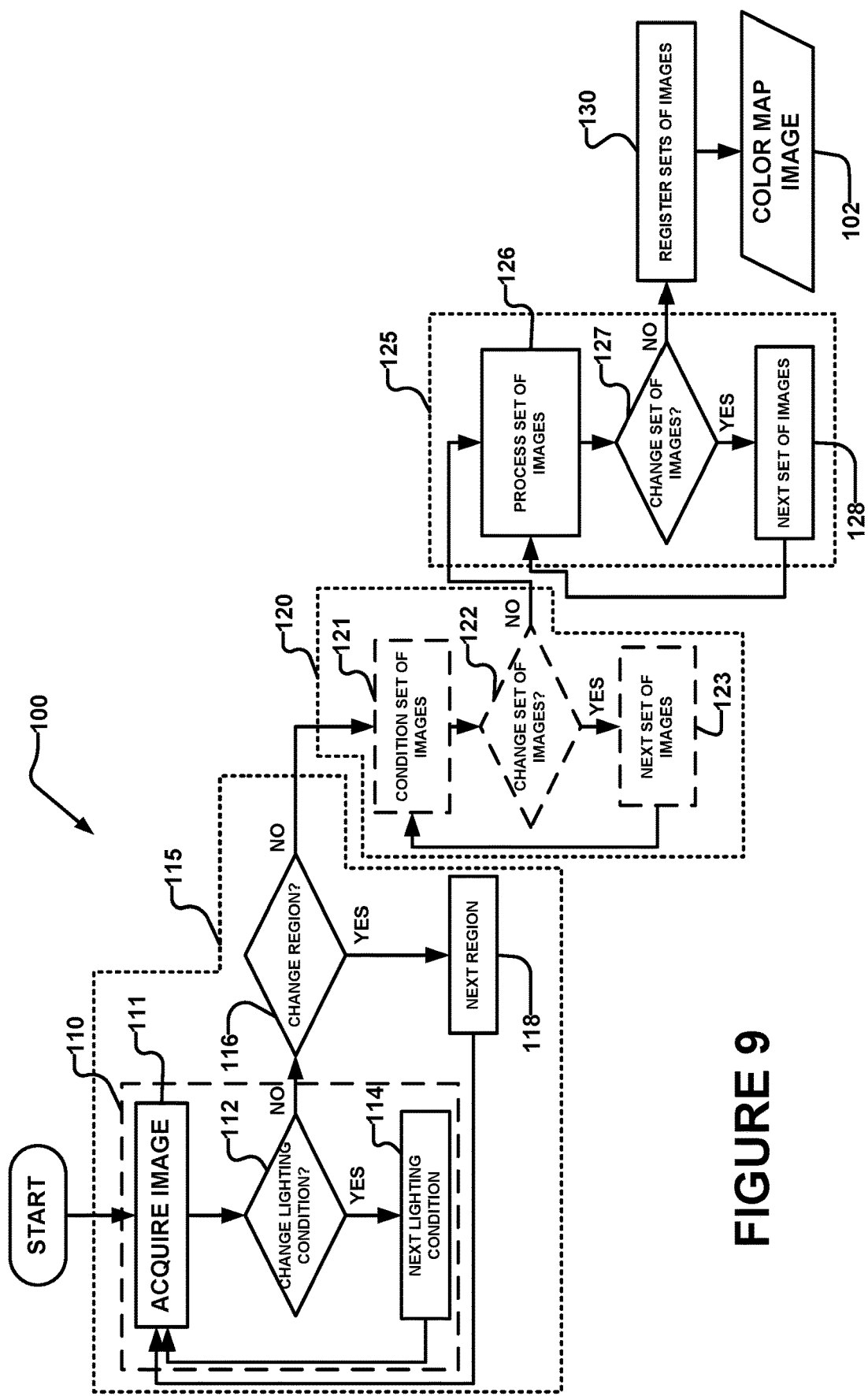
FIGS. 9-11 are flow charts showing methods according to example embodiments.

FIG. 9 is a flow chart showing an example method 100 for generating a color map image of painting 2. Loop 110 acquires a set of images of a region of painting 2. Each image in the set of images is acquired using different lighting conditions. For example, a different light source 32 may be active for each iteration of loop 110.

Loop 115 acquires a plurality of sets of images. Each set of images in the plurality corresponds to a different region (e.g. image frame) of painting 2. As described elsewhere herein, adjacent regions being imaged may overlap. For example, adjacent regions may overlap by approximately 50%.

In step 111 an image of a region is acquired. In step 112 method 100 determines whether the region should be imaged using another lighting condition. In some embodiments block 112 produces a NO result after loop 110 has repeated N times when N is the number of different light sources 32. In some embodiments a predetermined sequence of lighting conditions is used for each region. If another lighting condition is to be used, step 114 selects the next lighting condition. Otherwise method 100 proceeds to step 116.

Step 116 verifies whether another set of images of painting 2 is to be acquired. If so, a next region of painting 2 to be imaged is selected in step 118. Step 118 may cause imaging system 23 to be moved to the correct position for imaging the next region. Loop 110 may then be repeated until the required images for the next region have been obtained. Otherwise method 100 proceeds to optional conditioning loop 120. If conditioning loop 120 is skipped, method 100 proceeds to processing loop 125.

Conditioning loop 120 may be used to reduce image distortions that may be present in the plurality of sets of images (e.g. "condition the sets of images"). For example, conditioning loop 120 may apply processing which corrects for distortions introduced by optical system 31 (e.g. as a result of lens aberrations, etc.). As another example, conditioning loop 120 may apply processing which corrects for color distortions introduced by an imaging sensor of camera 30. In some embodiments conditioning loop 120 reduces radial distortion, compensates for non-perpendicularity of an optical axis of optical system 31, calibrates lighting values and/or calibrates color values. Processing techniques for performing these and other conditioning are known.

Step 121 conditions a set of images. Step 122 verifies whether another set of images is to be conditioned. If so, step 123 takes a next set of images. In some embodiments each of the plurality of sets of images is conditioned by conditioning loop 120.

Processing loop 125 reduces specular highlights and/or shadows that may be present in each of plurality of sets of images. Step 126 reduces specular highlights and/or shadows that may be present in a set of the plurality of sets of images. In some embodiments reducing specular highlights and/or shadows from a set of images comprises comparing the images of the set of images to identify pixels in the images that appear to be affected by specular reflection and/or pixels in the images that appear to be affected by shadows. The affected pixels may be ignored. A processed image of the region that is substantially free from the effects of specular reflection and/or shadows may be created using non-affected pixels from the set of images. For example, a single combined image may be constructed using pixel values from the images that are not affected by specular reflections or shadows. For pixels where two or more of the images have color values that do not appear to be affected by specular reflections or shadows the two or more color values may be combined to yield the color value for the corresponding pixel in the combined image.

Block 127 determines whether another set of images is to be processed using processing loop 125. If so, step 128 takes a next set of images.

Step 130 registers the combined images from each of the processed sets of images together to generate a color map image 102. In some embodiments step 130 registers each of the combined images of each set of images to generate color map image 102.

Figure 10:
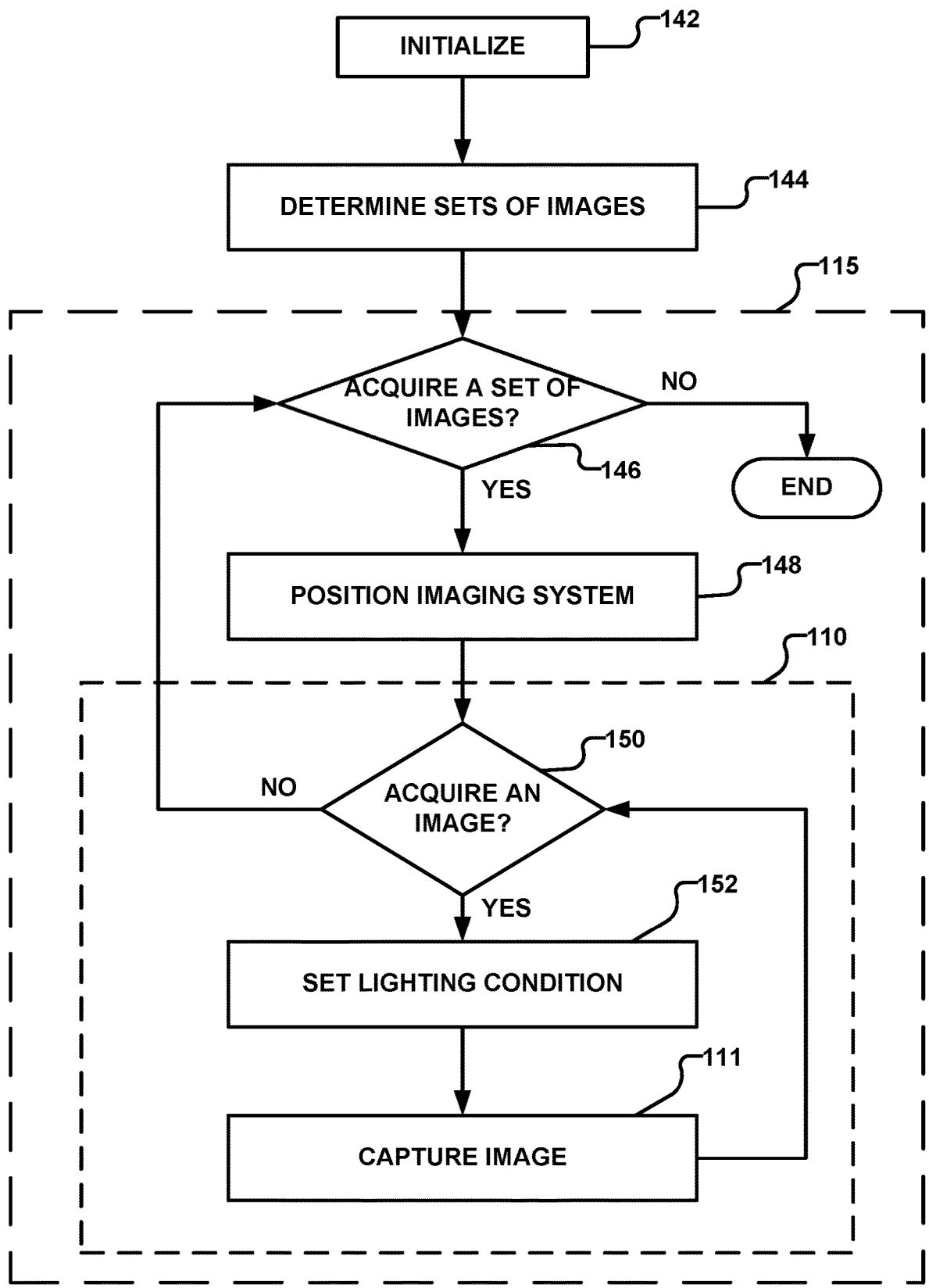

FIG. 10 is a flow chart showing example loops 110 and 115 for acquiring a plurality of sets of images of painting 2. Loops 110, 115 may initialize a system for acquiring images of painting 2 (e.g. system 20 described elsewhere herein). Loops 110, 115 may also determine how many images are to be acquired per region of painting 2 that is being imaged (e.g. N). Loops 110, 115 may also determine how many sets of images of painting 2 are to be acquired (e.g. how many different regions are to be imaged). Loops 110, 115 may then be executed to acquire the plurality of sets of images.

In step 142 a system for capturing images (e.g. system 20) may be initialized. In step 142, an imaging system (e.g. imaging system 23) may also be positioned relative to painting 2 to capture images of a first frame.

In step 144 the number of sets of images of painting 2 to be acquired is determined. The number of regions may be determined based on a size of painting 2, a size of a field of view of an imaging system used to capture images of painting 2 (e.g. imaging system 23), an amount by which adjacent regions should overlap, etc.

Steps 142 and 144 may be completed in any order. In some embodiments, steps 142 and 144 are completed concurrently. In some embodiments step 142 is completed before step 144. In some embodiments step 144 is completed before step 142.

In step 146, loop 115 may confirm that additional sets of images of painting 2 are to be imaged (e.g. images of additional regions of painting 2 are to be acquired). In step 148 the imaging system may be positioned to capture the set of images if the imaging system has not already been previously positioned. In step 150, loop 110 may confirm that additional images of a region are to be captured (e.g. not all lighting conditions have been used). In step 152 a lighting condition to be used is configured. In step 111, an image of the current region being imaged is captured using the lighting condition configured in step 152.

Once all sets of images of painting 2 have been acquired, loop 115 may terminate.

Figure 11:
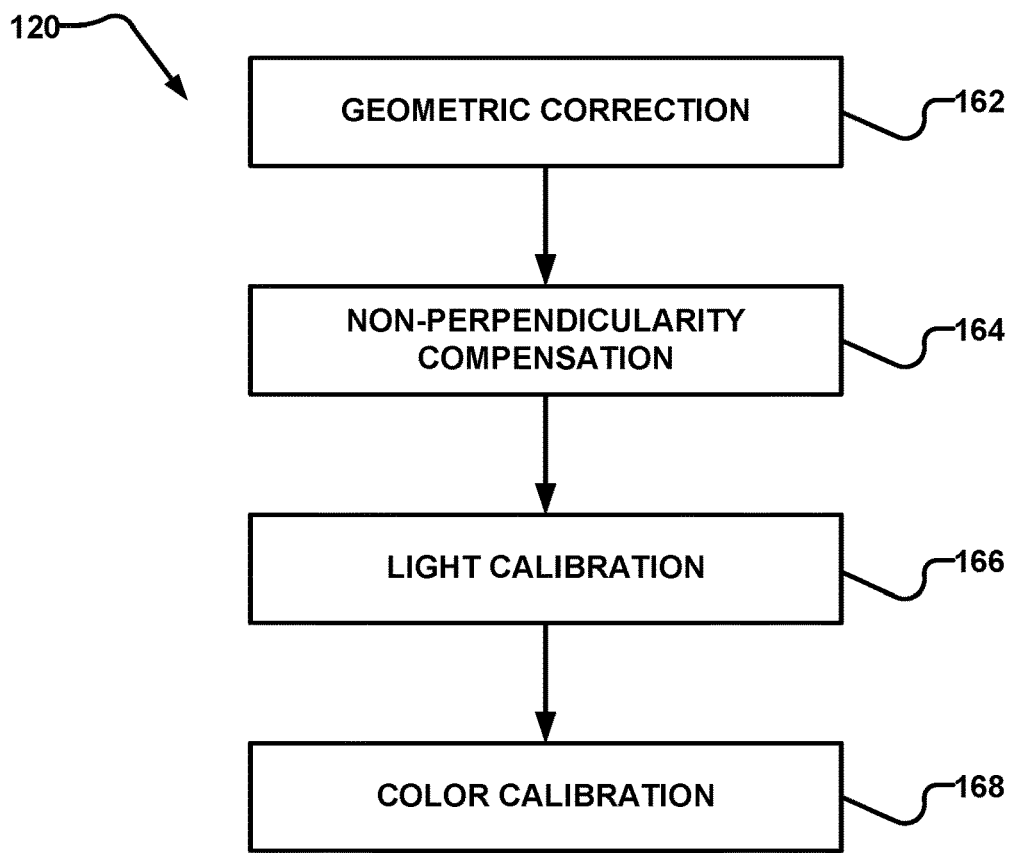

FIG. 11 illustrates an example conditioning loop 120.

In step 162 geometric correction may be performed. Geometric correction may correct radial distortions (e.g. radial shifting of pixels) that an optical system (e.g. optical system 31 described elsewhere herein) used to capture images of painting 2 may introduce into the images. In some cases, aberrations inherent in optical system 31 distort acquired images. In preferred embodiments the geometric correction is applied equally to each image of each set of the plurality of sets of images of painting 2.

In some embodiments the radial correction is performed using commercially available software such as Photoshop™ or software available from DxO™ Labs of France. In some such embodiments the radial correction may apply a radial correction that has a chromatic dependence.

In some embodiments a model for correcting radial distortion is developed by imaging a suitable graticule or other geometric pattern. For example, a graticule may be a pattern of lines having a known spacing (e.g. a square grid of equally-spaced lines).

In step 164 acquired images are processed to compensate for any non-perpendicularity of the lens axis relative to painting 2. The graticule used in step 162 may be used. Such graticule may be conveniently located on an easel that supports painting 2 (e.g. easel 22). As another example, the graticule may be located adjacent painting 2.

Step 164 comprises capturing an image of the graticule. The captured image of the graticule may be processed to correct for lens distortion. In some embodiments the captured image of the graticule is processed using step 162 described above.

Upon processing of the captured image of the graticule, a suitable affine transformation may be determined. In preferred embodiments application of the affine transformation to the captured image of the graticule results in the captured image of the graticule exactly replicating the lines of the graticule (e.g. making exact squares). The affine transformation is preferably constrained so that a central pixel of the image remains unshifted. The affine transformation may be stored and subsequently applied for conditioning images of painting 2. Advantageously, if sets of images of painting 2 have been acquired using the same imaging conditions, a single affine transformation may be applied to all of the acquired images.

As described elsewhere herein, a set of images of painting 2 may comprise a plurality of images acquired using different lighting conditions. The same affine transformation may be applied to correct all of the images. Doing so may ensure that the pixels of different ones of the images taken with different lighting conditions correspond to the same points on painting 2 after correction. Pixel-to-pixel registration of images taken with a fixed camera position and different lights may be maintained.

In step 166, calibration to account for non-uniformity in the illumination provided by light sources 32 may be performed. Performing step 166 may be desirable even if light emitted from a light source is substantially uniform.

In some embodiments a calibration tile is made from a flat and uniform material. The material may be substantially white. Preferably, light scattering exhibited by the material is substantially Lambertian. The material may, for example, be Spectralon™. In some embodiments, a commercially available calibration tile is used.

Step 166 may capture an image of the calibration tile (which may be called a "white target") using the same (or substantially similar) imaging conditions as were used to acquire the images of painting 2. One image of the calibration tile may be captured for each lighting condition. The images of the calibration tile may be acquired in a non-linear color space such as Adobe 1998.

Captured images of the calibration tile may be processed by converting each of the images to a linear color space. When the images are in the Adobe 1998 color space, this may be achieved, for example, by inverting a gamma transformation that forms part of the Adobe 1998 color space. Once the images are in a linear color space, the images may be fitted to a suitable smooth function or filtered using a low-pass image filter to reduce noise. The resulting color-linear intensity images for each light source may be stored. Storing each of the color-linear intensity images may allow images of the painting or of a color calibration image to be processed to account for non-uniformity in the illumination from light sources 32. For example, each image may be scaled by the appropriate intensity calibration image corresponding to the lighting condition that was used. Once processed, each image may be converted back to a conventional nonlinear color space. In some embodiments each image is converted back to a conventional nonlinear color space by applying a gamma correction. Each color-linear intensity image corresponding to a light source may compensate for any lighting non-uniformity of the light source that may be present across the field of view.

Step 166 may be described as a "white balance" correction.

Figure 11A:
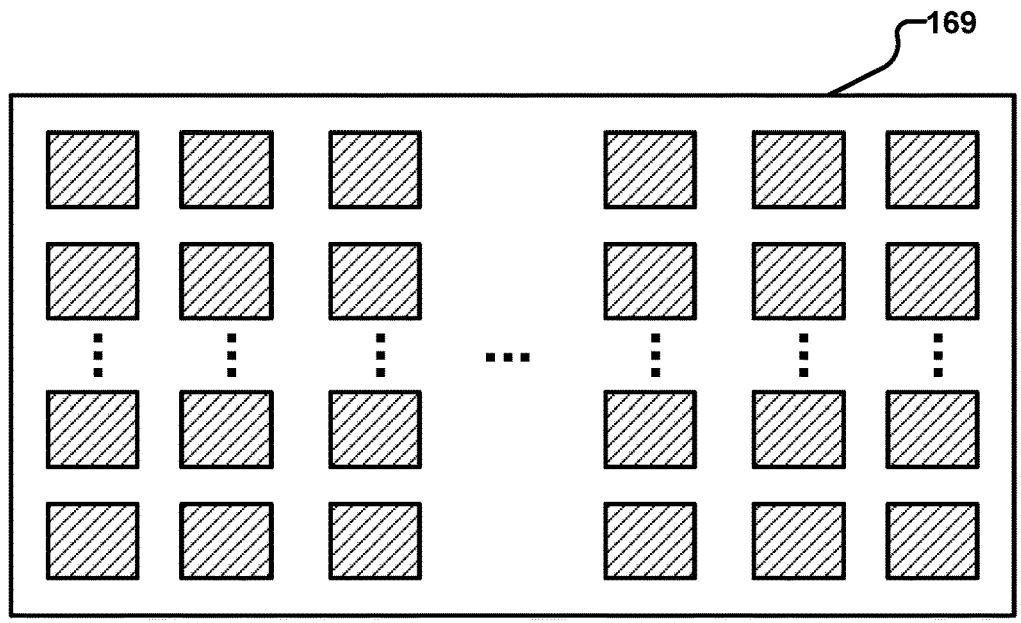
FIG. 11A is a schematic illustration showing an example color calibration target.

In step 168 a color calibration may be performed. The color calibration may be performed by using a color calibration target such as color calibration target 169 shown in FIG. 11A.

Color calibration target 169 comprises a series of differently-colored patches. Color calibration target 169 may, for example, have between 20 and 150 color patches. The color patches may comprise a mixture of neutral and colored pigments. Each of the color patches may have a specific known saturation, lightness and/or hue. In some embodiments, color calibration target 169 is a commercially available color chart such as a chart manufactured by X-Rite of the United States. In some embodiments, color calibration target 169 is a 24-patch Colorchecker Passport™ chart or a 135-patch Colorchecker SG™ chart (both manufactured by X-Rite).

Step 168 may capture images of color calibration target 169 using the same conditions (e.g. lighting configuration, camera settings, etc.) that were used to capture the plurality of images of the painting. Considering the relatively small field of view associated with using an optical system comprising a telecentric lens as described elsewhere herein, it may be convenient to image each patch of color calibration target 169 separately. The resulting images may be cropped and tiled together with relatively low accuracy without causing a problem for conventional color calibration software. Additionally, or alternatively, the color values may be extracted from each individual color patch and fed to a profile-generation software module. The resulting color calibration profile, preferably in the form of an ICC profile (the International Color Consortium who publish standards on this subject), may be stored for each lighting condition based on color calibration images taken with that lighting condition. The color correction profiles for a lighting condition may be applied to all images taken with that lighting condition.

In some embodiments, generating a color calibration profile for a lighting condition comprises comparing imaged color values of target 169 using the lighting condition with measured color values of target 169 using a calibrated instrument.

Conditioning each of the images with loop 120 may produce images that are geometrically calibrated, white balanced and color calibrated. Additionally, each image within a set of images may be registered to one another at a pixel level. Some embodiments may omit one or more steps of loop 120 or may omit loop 120 entirely. In some such embodiments a suitable color map image 102 may nevertheless be generated using the methods described elsewhere herein.

The steps of exemplary conditioning loop 120 may be performed in any order. A step of loop 120 may also be performed concurrently with one or more other steps of loop 120 or may be performed alone.

Figure 12:
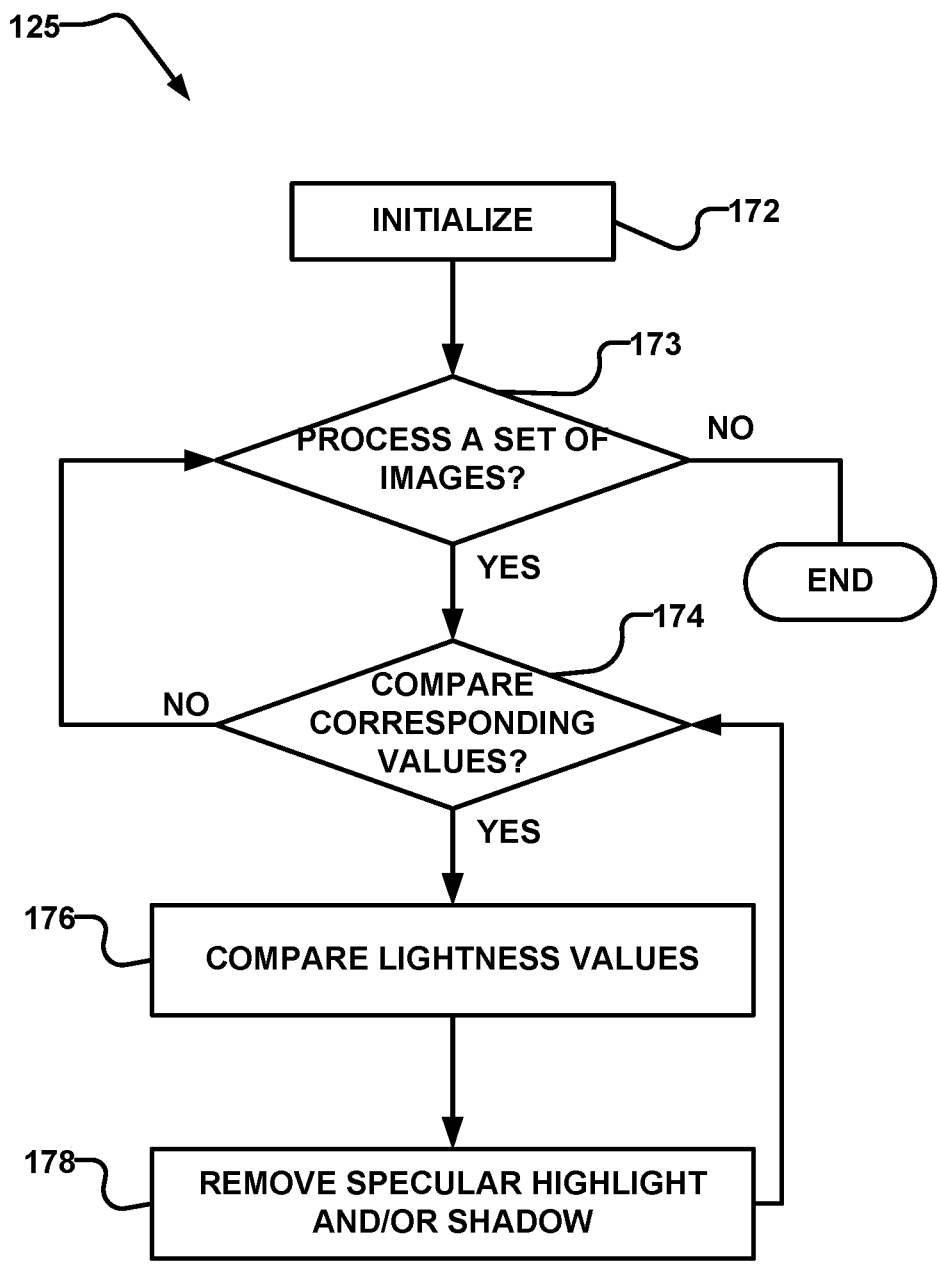
FIG. 12 is a flow chart showing a method according to an example embodiment.

Loop 125, shown in FIG. 12, may be used to process the sets of images of painting 2. Loop 125 compares corresponding lightness values across a set of images to identify any pixels in each of the images that appear to correspond to specular highlights and/or shadows. Loop 125 omits any lightness values identified as corresponding to a specular highlight and/or shadow from consideration when determining color map image 102.

In step 172, loop 125 is initialized. In step 173, loop 125 verifies whether a set of images is to be processed. If so, loop 125 may proceed to step 174. Otherwise loop 125 may terminate.

In step 174, loop 125 verifies that corresponding lightness values within a set of images are to be compared.

In step 176, corresponding lightness values are compared. In some embodiments, step 176 compares corresponding lightness values pixel-by-pixel within a set of images. For example, lightness values of all top left corner pixels in the set of images may be compared. Step 176 may compare lightness values for each pixel in the images.

In some embodiments each of the images in a set of images may be converted to a perceptually uniform color space with respect to lightness values. In preferred embodiments each of the images is converted to a CIELAB color space. Optionally all images of painting 2 may be converted to a perceptually uniform color space prior to step 176. In some embodiments all images of painting 2 are converted to a perceptually uniform color space at the beginning of loop 125.

Lightness values L may be calculated for each of the images in the set of images being processed. If each of the images has been previously converted to a perceptually uniform color space, lightness values L can be directly compared. However, this is not mandatory. If the images are represented in another color space (e.g. a RGB color space) lightness values may be calculated and compared.

A threshold lightness difference $\Delta L_T$ may be defined. The threshold lightness difference may be used to compare corresponding lightness values for a pixel across each of the conditioned images in a set of images (e.g. comparing a pixel location of a single region). If a pixel value in one of the images differs from other pixel values in the set of images (or differs from a representative value for that pixel, such as an average, mean, median or the like across the set of images) by more than the threshold lightness difference it may be assumed that the pixel value has been affected by a specular highlight or a shadow. Affected pixel values may be discarded or ignored.

If all of the corresponding lightness values are within a range $\Delta L_T$ of one another (or within a range $\Delta L_T$ of a representative lightness value for that pixel), the values may all be accepted. The accepted values may optionally be combined into a single value in the corresponding final output image. In some embodiments accepted values may be obtained by averaging. For example, the accepted values for red, green and blue channels in an Adobe 1998 encoding may be averaged. In some embodiments accepted values may be combined by averaging L, a and b values and reconverting to Adobe 1998 or another desired color space.

If the range of L values exceeds $\Delta L_T$ more complex processing may be performed. If the highest L value is significantly higher than the next nearest value (e.g. $\Delta L_T > 3$), the highest L value may be identified as specular and eliminated from consideration in step 178. In such cases, the specular contribution may be eliminated and the corresponding final output image pixel may be determined by combining the non-eliminated color values from the same pixels in other ones of the set of images which have non-specular values.

In some cases outliers may be caused by shadowing of the area of the image corresponding to that pixel for the particular light source, or in the case of a quite steeply sloped surface, the surface of the painting at the location corresponding to the pixel may be inclined by an angle and in a direction that greatly reduces the lightness for a given light source.

In some embodiments, excessively dark pixel levels (e.g. pixel values corresponding to shadows) may also be removed in step 178. If the lowest L value is significantly lower than the next nearest value (e.g. $\Delta L_T > 3$), the value may be identified as an outlier (e.g. a shadow). In some embodiments, such value is eliminated from contribution to the final output.

In some embodiments an elevation map may be used to determine whether a lightness value L higher than $\Delta L_T$ is likely to be a specular highlight or shadow. For example, if a pixel being processed is surrounded by brush strokes that have a higher elevation around three edges of the pixel, it is likely that light emitted on the three higher elevation edges will result in a shadow. This information may for example be used to reject shadow values (e.g. values that correspond to lower lightness values) even if the shadow values are a majority of the lightness values for that pixel.

If low-lightness outliers have also been eliminated, the corresponding final output image pixel may be determined by combining all non-eliminated values for a pixel that remain after specular and low-lightness values have been eliminated or by selecting a representative one of the non-eliminated values for the pixel.

In some embodiments non-eliminated values for a pixel are combined into a single pixel value in a single image corresponding to the set of images by averaging the non-eliminated values for the pixel.

In some embodiments, the threshold lightness difference $\Delta L_T$ is varied based on how successfully loop 125 removes specular highlights and/or shadows.

Loop 125 may compare each set of images pixel-by-pixel. Corresponding values for each pixel that have not been eliminated as a specular highlight or shadow may be combined together into a single processed pixel value. The single processed pixel values may form a processed image of the set of images that was processed effectively removing the effects of identified specular highlights and/or shadows.

Figure 13A:
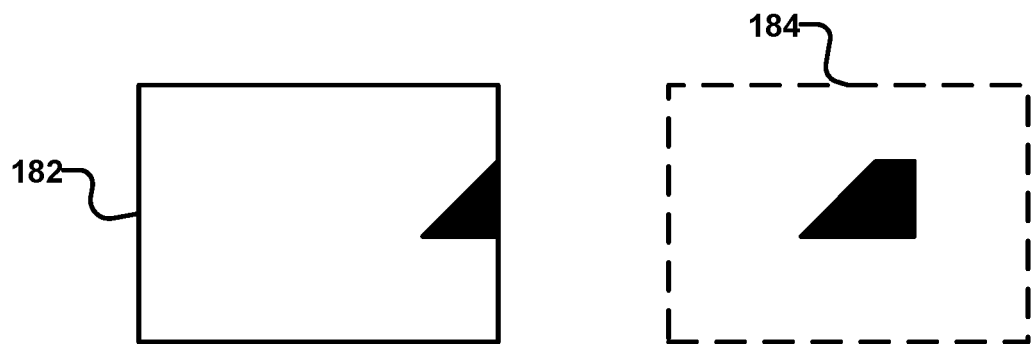
FIGS. 13A-13C are schematic illustrations showing an example image registration.
Figure 13B:
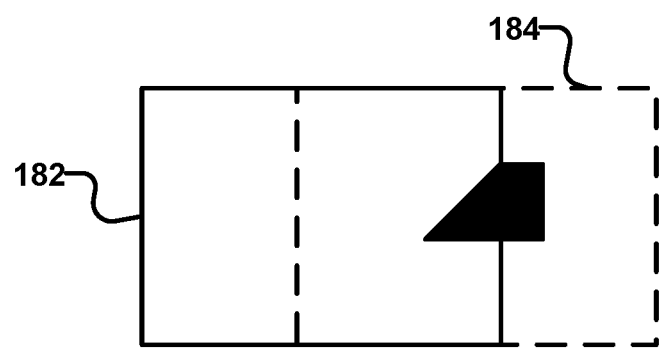
Figure 13C:
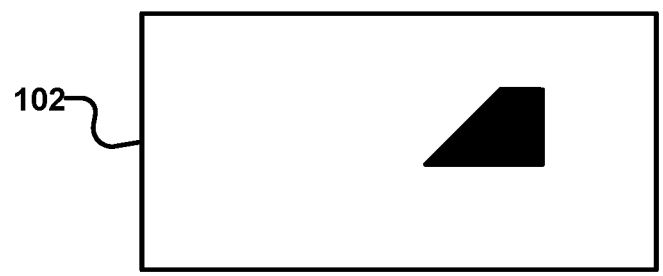

The processed output images corresponding to regions of painting 2 may be registered together (e.g. step 130 described elsewhere herein). For example, two processed images 182 and 184 (see FIG. 13A) may be registered together or stitched (see FIG. 13B) to generate a color map image 102 of painting 2 (see FIG. 13C). In some embodiments each of the sets of images is registered together. In some embodiments images may be registered together using a commercially available tool such as Photoshop™.

In some embodiments a human operator reviews the final composite image. In some embodiments threshold $\Delta L_T$ is varied to change effectiveness of loop 125 and/or method 100 for removing specular highlights and/or shadows. In some such embodiments corresponding final composite images are compared to determine how effectively specular highlights and/or shadows were removed.

In preferred embodiments scanner 28 collects color data corresponding to color values of painting 2. Obtaining the color data may comprise measuring reflectance of light of a plurality of wavelengths at points of painting 2. The collected color data may be used in combination with elevation data to produce a reproduction of painting 2. As described elsewhere herein, scanner 28 may comprise three single-mode lasers (e.g. 450, 532 and 638 nm lasers). Scanning painting 2 with such laser scanner may collect color data only corresponding to wavelengths of the single-mode lasers. Color data collected by the laser scanner may therefore be ambiguous regarding the precise color of a point on painting 2. For example, a specific color measurement by scanner 28 may correspond to any of a plurality of different spectral power distributions. The different spectral power distributions may appear differently to the human eye. Advantageously, color data represented by generated color map image 102 may be processed to refine color data collected by scanner 28.

Figure 14:
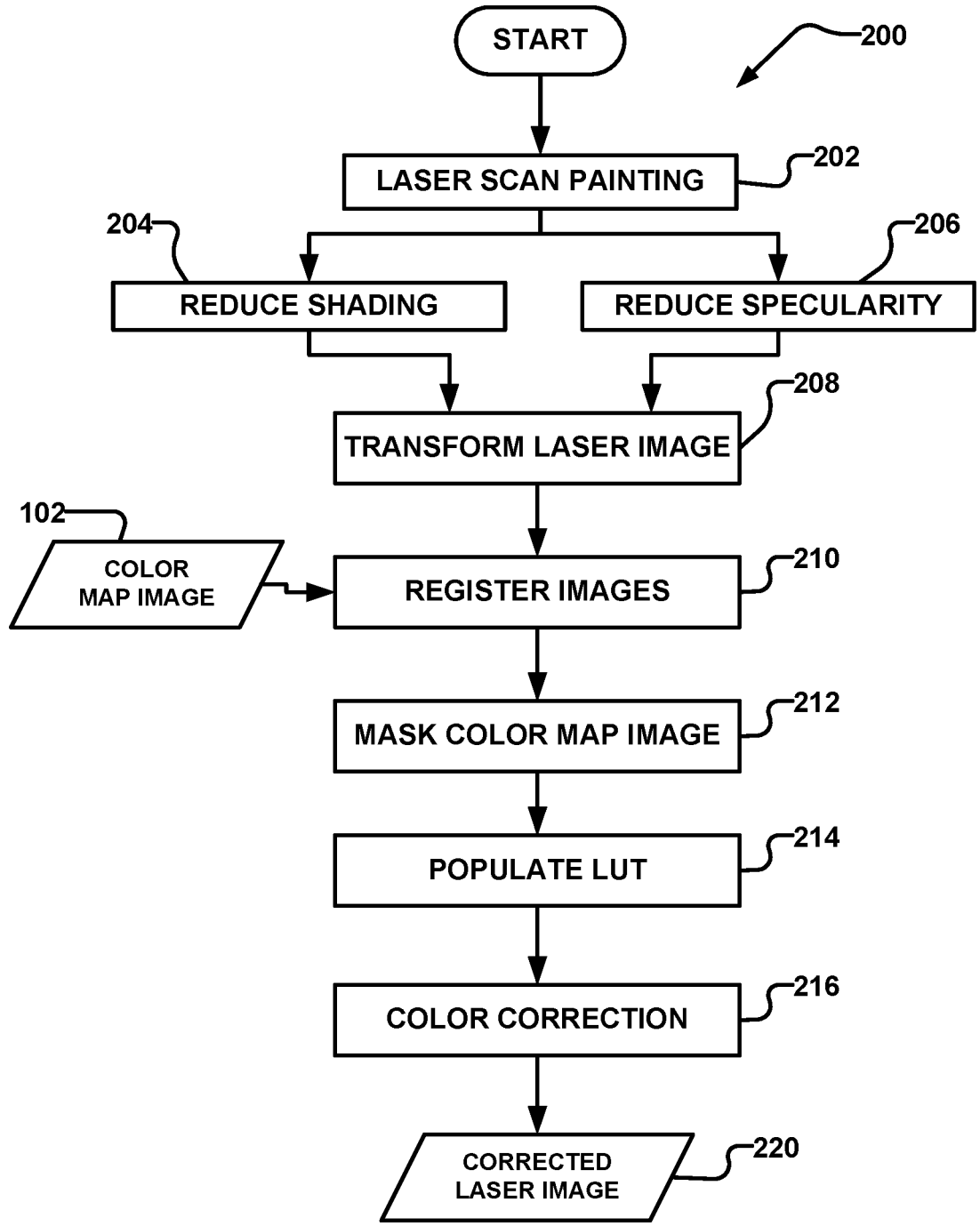
FIG. 14 is a flow chart showing a method according to an example embodiment.

FIG. 14 is a flow chart showing an example method 200 for refining color data collected by scanner 28.

In step 202 painting 2 is scanned with a laser scanner (e.g. scanner 28). In some embodiments the laser scanner serially scans painting 2. In some embodiments painting 2 is scanned at two complementary angles of incidence (as described elsewhere herein). For example, a line of painting 2 may be scanned at a first angle. The line of painting 2 may then be scanned at a second complementary angle before the laser scanner proceeds to scan another line of painting 2. In some embodiments the laser scanner scans the painting at angles of 20 degrees and –20 degrees relative to a normal vector of painting 2.

Scanning painting 2 with the laser scanner may collect point cloud data corresponding to the painting. Color and/or elevation maps may be generated from the point cloud data. In some embodiments the color and/or elevation maps have a resolution of 254 dpi (100 μm pixels) or finer.

The laser color data may be processed to reduce distortions that may be present in the data.

In step 204 the laser color data is processed to reduce shading effects. Shading effects can result when the optical path length from a pixel location on a painting to a light detector of the optical detector is different for different pixel locations and/or when the angle of inclination of the surface of the painting relative to an angle of incidence of laser light is different for different pixels locations.

Shading effects may, for example, be reduced for each pixel by scaling color values represented by each pixel. The laser color data may, for example, be scaled according to Lambert's law. In some embodiments the color values are scaled by dividing the color measurements represented by a pixel by a cosine of an angle between a surface normal of the painting at a point represented by the pixel value and a direction vector. The direction vector may extend from the point represented by the pixel to a center of an optical aperture corresponding to a detector configured to collect scattered light during the laser scanning. The computed quotient may then be multiplied by a square of a scalar distance between the point represented by the pixel to the center of the optical aperture of the detector. In some embodiments reflectance is normalized. Reflectance may, for example, be normalized by dividing the color measurements corresponding to the painting by color values measured for an ideal diffuse reference target with unit reflectance. Preferably, the color values corresponding to the ideal diffuse reference target are scaled as described herein.

In step 206 specular highlights are removed from the laser color data. If two laser scans with complementary angles have been performed, data from the scans may be registered and compared. Where laser color data for one angle of incidence is lighter than the laser color data for a complementary angle of incidence the lighter data may be assumed to correspond to specular reflection and may be ignored.

Steps 204 and 206 may be performed in any order. In some embodiments steps 204 and 206 are performed concurrently.

In some embodiments calibration scans may be performed before and/or after scanning of painting 2. The calibration scans may determine a black point and/or color channel gains. The calibrations scans may, for example, comprise scanning one or more calibration targets (e.g. a plurality of flat Spectralon™ targets that provide varying reflectance factors).

In step 208 processed laser data (e.g. an image representing color values of painting 2) is transformed into a suitable color space. In some embodiments a matrix transformation (3×3 in the case where the laser scanner scans at three wavelengths) converts the processed laser data (e.g. the processed laser RGB signals) to laser color values in the desired color space. The color space may for example be a tristimulus color space such as CIEXYZ. Coefficients for the matrix transformation may be derived from a least-squares regression of a suitably large number of measured reflection spectra of real objects having known colors. In some embodiments the transformation produces an exact color reproduction comprising chromaticity and/or absolute luminance identical to the known colors of each object. The CIEXYZ laser color values may then be converted to another color format for further processing such as the Adobe 1998 color space.

Steps 210 to 216 use the images obtained by imaging device 23 (e.g. color map 102) to adjust colors. These steps can help to correct for the fact that different pigments which appear different to the human eye may have the same color as measured by the laser scanner. Fortunately, in any particular painting 102 it is likely that pixels which provide the same laser color values are colored with the same pigment. Steps 210 to 216 may be performed in a suitable color space. In some cases the color space is an RGB color space such as the Adobe 1998 color space.

The converted laser data may be registered with a generated color map image 102 in step 210. This step allows direct comparison of colors detected by scanner and imaging device 23 at a pixel level. In some embodiments localized stretching of pixels (or fractions of pixels) is performed to achieve registration. In some embodiments correlations between sets of pixels of the laser data and sets of pixels of image 102 are analyzed to determine shifts necessary to align the pixels to within a fraction of the pitch of the pixels. In some embodiments black and/or white pixels of the laser data are matched with black and/or white pixels of image 102. In some such embodiments each channel of the laser data may be scaled to match a corresponding channel in image 102 at, for example, 0.5 and 99.95 percentile points.

A look-up table (LUT) for correcting color values in the laser data may be populated using color data from color map image 102 and the corresponding laser color values. Imaging device 23 may yield inaccurate color data for pixels that are in shadows, in parts of painting 2 that are steep or the like. Including such pixels in determining the values for the LUT could therefore result in significant errors. To avoid this, pixels in color map image 102 which are suspicious, for example because they correspond to steeply sloping parts of painting 2 or areas that may be in shadow or the like may be excluded from calculation of the LUT values (e.g. by being masked out). Elevation contours of painting 2 may, for example, be determined from collected elevation data. In step 212, pixels of image 102 are masked.

The masked pixels of image 102 may, for example, comprise pixels representing photometric shading. For example, any pixel corresponding to a point on painting 2 for which a surface normal is more than a threshold angle from a viewing direction (e.g. 30 degrees) may be masked.

Additionally, or alternatively, pixels representing cast shadows may be masked out. In some embodiments pixels are identified as corresponding to a cast shadow by comparing a surface gradient of a pixel to an illumination gradient of the pixel. If the surface gradient is more negative than the illumination gradient, the pixel may be masked out for corresponding to a cast shadow. In some embodiments a shadow mask is separately generated for each laser scan (e.g. if two laser scans were performed, two shadow masks may be generated). The generated shadow masks may optionally be combined into a single shadow mask that may be applied to color map image 102 to exclude pixels corresponding to cast shadows.

Additionally, or alternatively, a presence of specular highlights may be further reduced by masking out pixels identified as possibly corresponding to specular highlights. Elevation data may, for example, be used to determine pixel locations likely to represent specular highlights. In some embodiments specular peaks are modeled using a Lorentzian function. In some such embodiments, pixels corresponding to illumination angles within a threshold cone in radius about a specular peak may be masked out. The threshold cone may, for example, be represented by a parameter $\beta_{min}$, where $\beta_{min}$ is a suitable angle such as 20 degrees. In some embodiments it is unnecessary to mask out specular highlights because specular highlights have been reduced by an acceptable amount when generating color map image using the methods described elsewhere herein.

The size of the LUT may be chosen to be of a size such that a majority of LUT cells can contain data taken directly from non-masked pixels of the reference image. Other cells in the LUT may be filled by calculating values using a suitable fitting routine.

In step 214, the LUT is populated. A value of the laser data may be used as a key to address the LUT table. Populating the LUT may, for example, comprise taking a median of all color values from image 102 that correspond to pixels in the laser color data having a given color value. This may, for example, comprise comparing a color value of a pixel of the laser data to a corresponding pixel of image 102. A median value may then be determined of all un-masked color values in image 102 that are substantially similar to the color value of the pixel. Any empty points within an image gamut in the LUT may be populated by taking a median of non-empty nearest neighbors. Any empty points outside the gamut typically play a limited role and may optionally be filled with corresponding gray scale values. In some embodiments a 3×3×3 median filter is applied to all values in the LUT.

In step 216 color values represented by pixels of the laser data may be corrected. Color values represented by pixels of the laser data may, for example, be corrected by retrieving corresponding color values from the LUT.

Color image 220 comprising corrected laser color data may be combined with elevation data to produce a high-quality digital reproduction of painting 2.

Typically a generated LUT is specific to a set of pigments used by an artist to paint a specific painting. However, in some cases, an artist may choose to paint a series of paintings using the same set of pigments. In such cases, one LUT may be used to correct laser data for each of the paintings in the series. This may, for example, reduce processing time as a LUT must be generated only for the first painting in the series. Alternatively, a set of images 102 corresponding to each of the paintings in the series may be used to generate a LUT with more accurate color values.

The systems and methods described herein may be applied to acquire high quality digital representations of any painting or drawing and/or to create replicas of the painting or drawing.

Example Use Scenario

An owner (e.g. a private collector, a museum, an art gallery, etc.) of a fine art painting may decide that the painting should be safely stored. However, safely storing the painting (e.g. in a vault) would deprive the owner and/or others from viewing the painting. The owner may wish to obtain a faithful reproduction of the painting that may be displayed.

The owner may arrange for a system 20 to be brought to a location where the painting may be scanned or for the painting to be brought to a location of a system 20.

The painting may be scanned by system 20 as described herein to obtain digital data that fully describes the color and 3D form of the painting as described herein. System 20 may generate an elevation map and a corresponding color map image of the painting. Preferably a final color map image to be used when producing a reproduction is generated by correcting laser color data using a color map image generated from photographs of the painting as described elsewhere herein. The elevation map image and the color map image of the painting may be communicated to a 3D printer. The 3D printer can then produce a 3D reproduction of the painting based on the communicated data.

In some cases, the 3D printer and system 20 are at the same location. In some cases, the 3D printer and system 20 are at different locations.

In some cases the elevation map and/or color map image of the painting may be stored. Advantageously this allows for additional reproductions of the painting to be reproduced later on without having to retrieve the original painting from its safe storage location. The stored elevation map and/or color map image may also be used to generate digital renderings of the painting.

In some cases the painting is inspected prior to being positioned within system 20. If the painting is deemed to be fragile (e.g. having a high risk of being damaged if placed within system 20), the painting may not be positioned within system 20. Additionally, or alternatively, damaged sections of the painting may be noted. In some cases the damaged sections are corrected in the generated elevation map and/or color map image. In some cases software interpolates values for the damaged sections. In some cases an operator manually inputs values for the damaged sections.

In some cases an expert compares the reproduction of the painting to the original painting. If the produced reproduction does not faithfully reproduce the original painting, a new reproduction may be produced.

Interpretation of Terms

Unless the context clearly requires otherwise, throughout the description and the
- "comprise", "comprising", and the like are to be construed in an inclusive sense, as opposed to an exclusive or exhaustive sense; that is to say, in the sense of "including, but not limited to";
- "connected", "coupled", or any variant thereof, means any connection or coupling, either direct or indirect, between two or more elements; the coupling or connection between the elements can be physical, logical, or a combination thereof;

"herein", "above", "below", and words of similar import, when used to describe this specification, shall refer to this specification as a whole, and not to any particular portions of this specification;

"or", in reference to a list of two or more items, covers all of the following interpretations of the word: any of the items in the list, all of the items in the list, and any combination of the items in the list;

the singular forms "a", "an", and "the" also include the meaning of any appropriate plural forms.

Words that indicate directions such as "vertical", "transverse", "horizontal", "upward", "downward", "forward", "backward", "inward", "outward", "vertical", "transverse", "left", "right", "front", "back", "top", "bottom", "below", "above", "under", and the like, used in this description and any accompanying claims (where present), depend on the specific orientation of the apparatus described and illustrated. The subject matter described herein may assume various alternative orientations. Accordingly, these directional terms are not strictly defined and should not be interpreted narrowly.

Embodiments of the invention may be implemented using specifically designed hardware, configurable hardware, programmable data processors configured by the provision of software (which may optionally comprise "firmware") capable of executing on the data processors, special purpose computers or data processors that are specifically programmed, configured, or constructed to perform one or more steps in a method as explained in detail herein and/or combinations of two or more of these. Examples of specifically designed hardware are: logic circuits, application-specific integrated circuits ("ASICs"), large scale integrated circuits ("LSIs"), very large scale integrated circuits ("VLSIs"), and the like. Examples of configurable hardware are: one or more programmable logic devices such as programmable array logic ("PALs"), programmable logic arrays ("PLAs"), and field programmable gate arrays ("FPGAs")). Examples of programmable data processors are: microprocessors, digital signal processors ("DSPs"), embedded processors, graphics processors, math co-processors, general purpose computers, server computers, cloud computers, mainframe computers, computer workstations, and the like. For example, one or more data processors in a control circuit for a device may implement methods as described herein by executing software instructions in a program memory accessible to the processors.

Processing may be centralized or distributed. Where processing is distributed, information including software and/or data may be kept centrally or distributed. Such information may be exchanged between different functional units by way of a communications network, such as a Local Area Network (LAN), Wide Area Network (WAN), or the Internet, wired or wireless data links, electromagnetic signals, or other data communication channel.

For example, while processes or blocks are presented in a given order, alternative examples may perform routines having steps, or employ systems having blocks, in a different order, and some processes or blocks may be deleted, moved, added, subdivided, combined, and/or modified to provide alternative or subcombinations. Each of these processes or blocks may be implemented in a variety of different ways. Also, while processes or blocks are at times shown as being performed in series, these processes or blocks may instead be performed in parallel, or may be performed at different times.

In addition, while elements are at times shown as being performed sequentially, they may instead be performed simultaneously or in different sequences. It is therefore intended that the following claims are interpreted to include all such variations as are within their intended scope.

Aspects of the invention may also be provided in the form of a program product. The program product may comprise any non-transitory medium which carries a set of computer-readable instructions which, when executed by a data processor, cause the data processor to execute a method of the invention. Program products according to the invention may be in any of a wide variety of forms. The program product may comprise, for example, non-transitory media such as magnetic data storage media including floppy diskettes, hard disk drives, optical data storage media including CD ROMs, DVDs, electronic data storage media including ROMs, flash RAM, EPROMs, hardwired or preprogrammed chips (e.g., EEPROM semiconductor chips), nanotechnology memory, or the like. The computer-readable signals on the program product may optionally be compressed or encrypted.

In some embodiments, aspects of the invention may be implemented in software. For greater clarity, "software" includes any instructions executed on a processor, and may include (but is not limited to) firmware, resident software, microcode, and the like. Both processing hardware and software may be centralized or distributed (or a combination thereof), in whole or in part, as known to those skilled in the art. For example, software and other modules may be accessible via local memory, via a network, via a browser or other application in a distributed computing context, or via other means suitable for the purposes described above.

Where a component (e.g. a software module, processor, assembly, device, circuit, etc.) is referred to above, unless otherwise indicated, reference to that component (including a reference to a "means") should be interpreted as including as equivalents of that component any component which performs the function of the described component (i.e., that is functionally equivalent), including components which are not structurally equivalent to the disclosed structure which performs the function in the illustrated exemplary embodiments of the invention.

Specific examples of systems, methods and apparatus have been described herein for purposes of illustration. These are only examples. The technology provided herein can be applied to systems other than the example systems described above. Many alterations, modifications, additions, omissions, and permutations are possible within the practice of this invention. This invention includes variations on described embodiments that would be apparent to the skilled addressee, including variations obtained by: replacing features, elements and/or acts with equivalent features, elements and/or acts; mixing and matching of features, elements and/or acts from different embodiments; combining features, elements and/or acts from embodiments as described herein with features, elements and/or acts of other technology; and/or omitting combining features, elements and/or acts from described embodiments.

Various features are described herein as being present in "some embodiments". Such features are not mandatory and may not be present in all embodiments. Embodiments of the invention may include zero, any one or any combination of two or more of such features. This is limited only to the extent that certain ones of such features are incompatible with other ones of such features in the sense that it would be impossible for a person of ordinary skill in the art to construct a practical embodiment that combines such incompatible features. Consequently, the description that "some embodiments" possess feature A and "some embodiments" possess feature B should be interpreted as an express indication that the inventors also contemplate embodiments which combine features A and B (unless the description states otherwise or features A and B are fundamentally incompatible).

It is therefore intended that the following appended claims and claims hereafter introduced are interpreted to include all such modifications, permutations, additions, omissions, and sub-combinations as may reasonably be inferred. The scope of the claims should not be limited by the preferred embodiments set forth in the examples, but should be given the broadest interpretation consistent with the description as a whole.

What is claimed is:

1. A method for generating a color map image of a painting, the color map image representing color values of the painting as a function of position in the painting, the method comprising:
    for each of a plurality of overlapping regions of the painting acquiring a set of images, each set of images comprising at least first and second images of a corresponding one of the overlapping regions, the first image acquired while the corresponding one of the overlapping regions is illuminated by light incident on the corresponding one of the overlapping regions from a first direction and the second image acquired while the corresponding one of the overlapping regions is illuminated by light incident on the corresponding one of the overlapping regions from a second direction different from the first direction, the imaging performed by an imaging device including an imaging sensor and an optical system arranged to focus an image of the corresponding one of the overlapping regions onto the imaging sensor, the optical system having an object space telecentric configuration wherein chief light rays from points in the corresponding one of the overlapping regions that are parallel to an optical axis of the optical system pass centrally through an aperture of the optical system, a front element of the optical system closest to the painting is at least as large as the corresponding one of the overlapping regions;
    for each of the sets of images, processing the images of the set of images to provide a processed image of the corresponding one of the overlapping regions from which one or both of specular highlights and shadows are removed or reduced; and
    registering the processed images together to generate the color map image.

2. The method according to claim 1 wherein processing each of the sets of images to remove or reduce one or both of specular highlights and shadows comprises comparing lightness values for corresponding pixels of different images in the set of images being processed to identify pixels in each of the different images for which lightness values differ by more than a threshold amount from lightness values for the corresponding pixels in other ones of the different images.

3. The method according to claim 2 comprising analyzing surface geometry of the painting in a patch surface surrounding a pixel and based on the geometry determining whether one or more corresponding values of the pixel represent a specular highlight or shadow.

4. The method according to claim 3 wherein generating the processed image for the corresponding one of the overlapping regions comprises combining corresponding pixel values of the set of images while excluding from the combining any pixel values identified as corresponding to a specular highlight or shadow for each pixel in the set of images of the corresponding one of the overlapping regions.

5. The method according to claim 4 wherein combining the corresponding pixel values comprises determining a single representative value for the corresponding pixel values from the set of images.

6. The method according to claim 5 wherein determining the single representative value comprises one or more of determining an average value, determining a median value and determining a mode value for the corresponding pixel values from the set of images.

7. The method according to claim 6 comprising conditioning images of the set of images, the conditioning comprising one or more of reducing radial distortion of pixels, compensating for non-perpendicularity of the central optical axis relative to the painting, compensating for non-uniform detection of lighting values and correcting color values.

8. The method according to claim 1 comprising translating the optical system and imaging sensor relative to the painting to image the different overlapping regions of the painting.

9. The method according to claim 1 wherein, for each of the overlapping regions, acquiring the corresponding set of images comprises, while acquiring each of the first and second-images, controlling a light source to emit light that is incident on the corresponding one of the overlapping regions at an angle to a plane of the painting, wherein a direction from which the light is incident on the corresponding one of the overlapping regions is different for the first and second images.

10. The method according to claim 9 wherein the light source emits collimated light and an angle of incidence of the light beam onto the corresponding one of the overlapping regions is the same across a field of view of the optical system.

11. The method according to claim 10 wherein the light source comprises a set of light sources arranged in a line.

12. The method according to claim 9 wherein the emitted light has uniform intensity across a field of view of the optical system.

13. The method according to claim 1 wherein for a plurality of points on a surface of the painting and radially spaced apart from the central optical axis, the points have differing elevations and the optical system eliminates or reduces radial shifting of colors at the imaging sensor.

14. The method according to claim 1 wherein for a plurality of points on a surface of the painting, the points having varying elevations, the optical system projects the plurality of points onto an imaging plane of the imaging sensor with a substantially constant magnification as a distance between the front element of the optical system and the painting is adjusted.

15. The method according to claim 1 wherein the optical system reduces or removes parallax error corresponding to acquiring images of a point on a surface of the painting in different overlapping regions.

16. The method according to claim 1 further comprising:
    scanning the painting with a laser scanner to collect color data representative of the painting;
    refining the laser color data with the generated color map image, the refining comprising:

registering the laser color data with the generated color map image;

populating a look-up table using color values from the generated color map image and color values from the laser color data, the look-up table corresponding to a color gamut of pigments used to create the painting; and replacing one or more color values from the laser color data that do not match color values from the look-up table with color values from the look-up table.

17. The method according to claim 16 comprising processing the laser color data prior to refining the laser color data, the processing comprising one or more of scaling the laser color data, reducing shading effects present in the laser color data and reducing specular highlights present in the laser color data.

18. The method according to claim 17 comprising masking out values of pixels in the generated color map image prior to populating the look-up table, the masked out values representing one or more of photometric shading, cast shadows and specular highlights.

19. The method according to claim 18 wherein the laser scanning comprises scanning the painting at first and second complementary angles.

20. The method according to claim 19 wherein the laser scanner comprises a 450 nm, a 532 nm and a 638 nm single-mode laser.

* * * * *